US012508977B2

(12) United States Patent
Lee et al.

(10) Patent No.: US 12,508,977 B2
(45) Date of Patent: Dec. 30, 2025

(54) APPARATUS FOR AUTOMATICALLY LOCKING CONTAINER

(71) Applicants: Cheol Ho Lee, Sejong-si (KR); Yong Rak Kim, Ulsan (KR)

(72) Inventors: Cheol Ho Lee, Sejong-si (KR); Yong Rak Kim, Ulsan (KR)

(*) Notice: Subject to any disclaimer, the term of this patent is extended or adjusted under 35 U.S.C. 154(b) by 405 days.

(21) Appl. No.: 18/322,622

(22) Filed: May 24, 2023

(65) Prior Publication Data
US 2023/0294591 A1    Sep. 21, 2023

Related U.S. Application Data

(63) Continuation of application No. PCT/KR2021/015182, filed on Oct. 27, 2021.

(30) Foreign Application Priority Data

Nov. 25, 2020 (KR) .................. 10-2020-0160410

(51) Int. Cl.
*B60P 7/08*    (2006.01)
*B60P 7/13*    (2006.01)

(52) U.S. Cl.
CPC ......... *B60P 7/132* (2013.01); *B60Y 2200/147* (2013.01); *B60Y 2200/33* (2013.01)

(58) Field of Classification Search
CPC  B60P 7/132; B60P 7/13; B60P 7/0807; B60P 7/0892; B60Y 2200/147; B60Y 2200/33
USPC ........................ 410/80, 82, 83, 90
See application file for complete search history.

(56) References Cited

U.S. PATENT DOCUMENTS

| 4,430,032 A * | 2/1984 | Morgan ............... B60P 7/13 |
| | | 410/70 |
| 4,844,672 A * | 7/1989 | Yurgevich ........... B60P 7/13 |
| | | 410/84 |
| 2008/0170924 A1* | 7/2008 | Morin ................. B60P 7/132 |
| | | 410/80 |

FOREIGN PATENT DOCUMENTS

| JP | 2016-204024 A | 12/2016 |
| KR | 10-2000-0030171 A | 6/2000 |
| KR | 20-0384373 Y1 | 5/2005 |
| KR | 10-2009-0054498 A | 6/2009 |

(Continued)

OTHER PUBLICATIONS

International Search Report issued in PCT/KR2021/015182; mailed Feb. 8, 2022.

*Primary Examiner* — Stephen T Gordon
(74) *Attorney, Agent, or Firm* — Studebaker Brackett PLLC

(57) ABSTRACT

The present disclosure relates to an apparatus for automatically locking a container, which includes: a cylindrical housing: a top plate installed on the top of the housing; a bottom plate installed under the housing; an elevation unit installed to move up and down in the housing; a locker installed to rotate left and right to lock and unlock a container; a guide guiding up-down movement and rotation movement of the locker; a first elastic supporting member elastically supporting upward the elevation unit; and a second elastic supporting member elastically supporting upward the locker. Accordingly, the present disclosure provides an effect that a container is automatically locked or unlocked by its own weight when it is loaded or unloaded, so it is possible to safely transport heavy containers always in a locked state and it is possible to prevent malfunction or poor function of the locker.

9 Claims, 20 Drawing Sheets

(56) References Cited

FOREIGN PATENT DOCUMENTS

| | | | |
|---|---|---|---|
| KR | 10-1313260 | B1 | 9/2013 |
| KR | 10-2291850 | B1 | 8/2021 |

* cited by examiner

APPARATUS FOR AUTOMATICALLY LOCKING CONTAINER

CROSS REFERENCE TO RELATED APPLICATION

The present application is a Continuation of International Application No. PCT/KR2021/015182 filed on Oct. 27, 2021, which claims priority to Korean Patent Application No. 10-2020-0160410, filed Nov. 25, 2020, the entire contents of which is incorporated herein for all purposes by this reference.

BACKGROUND OF THE INVENTION

Field of the Invention

The present disclosure relates to an apparatus for automatically locking a container and, in more detail, an apparatus for automatically locking a container, the apparatus locking or unlocking a container loaded on a trailer or a railroad car.

Description of the Related Art

In general, a container, which is a kind of carrying receptacles, is a case that has a predetermined size and can carry large-volume freight for land transportation or marine transportation, and means a loading box for safely and conveniently transport freight. Further, a container is a standardized receptacle for mass freight.

Such containers are loaded and transported on container vehicles on the land and are transported on the sea in large quantities using large container ships for loading containers.

A trailer and a railroad vehicle are used as transportation for carrying containers on roads or railroads, and particularly, such trailers generally accompany a tractor without a powertrain or a control system for driving.

Trailers are designed to be suitable for the sizes of containers to be able to load standardized containers and are designed also in consideration of the weight of containers with freight loaded therein. Trailers designed in this way are loaded with one or two containers and a locking apparatus that fixes containers is installed on trailers to prevent containers from moving and separating from the trailers due to sudden braking, curves, hills, and other sudden situations during transportation.

Accordingly, trailers are equipped with a locking apparatus for fixing containers and the locking apparatus is integrally fastened to the trailers so that the trailers are driven with the locking apparatus locked under the regulations.

However, most drivers drive without a locking apparatus locked in many cases due to the inconvenience that they have to lock and unlock a locking apparatus every time they load and unload and the defect that working time increases.

In particular, when trailers are driven without a locking apparatus locked on difficult roads such as a sharp curve, large accidents such as separating or dropping of containers from the trailer is caused, which results in lots of damage to the life and property and severe problems such as threatening the life of not only the driver, but others.

In general, containers manufactured to pack and transport various objects in large quantities and trailers that are exclusive vehicles for carrying such containers are equipped with a locking apparatus for fixing loaded containers, and it is imposed to use such a locking apparatus by the laws.

That is, such a locking apparatus performs a function of promoting safety in transportation by integrally fastening a trailer and a container loaded thereon and such a fixing device is disposed to a fixing hole formed at corners and the middles of lengths along the edges of the bottom of a container.

Fixing devices for fixing containers were manually fixed with containers loaded on a vehicle in most cases in the past, but recently, automatic fixing devices that are automatically locked when a container is loaded on a vehicle have been proposed and used.

Meanwhile, such fixing devices of the related art are always exposed to the outside, so rainwater can flow into the device anytime. Further, since the fixing devices is unavoidably weak to corrosion because they are made of metal.

However, in the related art, since a locker is rotated always with the bottom of an operating member in surface contact with a stopping step of the locker, friction between surfaces acts as load on rotation of the locker. In particular, when the bottom of an operating member and the stopping step of a locker corrode while a predetermined period elapses, friction with the stopping step of the locker is increased even by descent of the operating member, so there is a problem that the locker cannot be rotated.

Further, when a locker cannot be rotated, an operating member also cannot be moved down to an accurate position, which may cause poor locking of a container. Further, when an operating member temporarily stops descending and then suddenly and instantaneously slides down on a surface due to the weight of a container, there is a problem that a locker or a pin is severely damaged such as bending or breaking due to the weight.

PRIOR ART DOCUMENT

Patent Document

Korean Patent No. 10-0834721 (2008 Jun. 3)
Korean Utility Model Publication No. 20-2008-0003813 (2008 Sep. 10)
Korean Patent No. 10-1016138 (2011 Feb. 17)

SUMMARY OF THE INVENTION

The present disclosure has been provided to solve the problems in the related art described above, and an objective of the present disclosure is to provide an apparatus for automatically locking a container, the apparatus including a housing, a top plate, a bottom plate, an elevation unit, a locker, a guide, a first elastic supporting member, and a second elastic supporting member, thereby providing an effect that a container is automatically locked or unlocked by its own weight when it is loaded or unloaded, so it is possible to safely transport heavy containers always in a locked state and it is possible to prevent malfunction or poor function of the locker.

Further, another objective of the present disclosure is to provide an apparatus for automatically locking a container in which convex portions and concave portions are alternately and continuously formed on the housing, contact with the elevation unit is minimized, whereby it is possible to make up-down movement easy and minimize malfunction in up-down movement.

Further, another objective of the present disclosure is to provide an apparatus for automatically locking a container in which a fixing-supporting hole and a drain hole are formed at the bottom plate, whereby it is possible to improve the fixing-supporting force for the guide and it is also possible to prevent damage to the bottom plate, the elevation unit, the locker, the guide, the first elastic supporting member, and the second elastic supporting member due to rainwater by draining rainwater flowing in the housing.

Further, another objective of the present disclosure is to provide an apparatus for automatically locking a container in which the elevation unit includes a first elevator and a second elevator of which the inner surface is recessed to surround the circumference of the locker, whereby it is possible to make coupling between the elevation unit and the locker easy, increase the lifespan by improve a coupling-supporting force between the elevation unit and the locker and improving moving performance such that they move together.

Further, another objective of the present disclosure is to provide an apparatus for automatically locking a container in which the corners of the locking head of the locker are curved and a luminescent member is installed on the locking head, whereby it is possible to prevent malfunction in locking and unlocking by the corners when loading or unloading a container and it is also possible to improve visibility when working at night.

Further, another objective of the present disclosure is to provide an apparatus for automatically locking a container in which the spiral portion of the guide groove of the locker is spirally curved to rotate the locking head over 90 degrees, whereby it is possible to improve a force for rotating the locking head and improve reliability in rotation of the locking head.

In order to achieve the objectives of the present disclosure, an apparatus for automatically locking a container that locks and unlocks a container loaded on a trailer or a railroad vehicle, includes: a cylindrical housing of which an internal cross-section is bent in a curved shape; a top plate installed on a top of the housing; a bottom plate installed under the housing; an elevation unit installed to move up and down in the housing; a locker installed in the elevation unit to move up and down together and installed to rotate left and right to lock and unlock a container; a guide being erect at a center of the bottom plate, inserted in a lower portion of the locker, and guiding up-down movement and rotation movement of the locker; a first elastic supporting member installed between the bottom plate and the elevation unit and elastically supporting upward the elevation unit; and a second elastic supporting member installed between the locker and the guide and elastically supporting upward the locker.

The housing of the present disclosure includes: a plurality of protrusions formed with regular intervals circumferentially on an outer side and protruding outward; and a plurality of recessions extending between the protrusions and recessed inward.

The bottom plate of the present disclosure includes: a bottom cover coupled to cover a bottom of the housing; a fixing-supporting hole that is formed at a center portion of the bottom cover and in which the guide is fitted and fixed; and a drain hole installed at a portion of the bottom cover and discharging rainwater flowing in the housing.

The elevation unit of the present disclosure includes: a first elevator having fitting projections protruding at both ends and having a recessed inner surface to surround the circumference of a portion of the locker; and a second elevator having recessed fitting grooves, in which the fitting projections are coupled, at both ends to be coupled to the first elevator, and having a recessed inner surface to surround the circumference of another portion of the locker.

The locker of the present disclosure includes: an elevation pin coupled and moving up and down in the elevation unit; a locking head protruding in a rectangular cone shape from an upper end of the elevation pin; a stopping step protruding around a lower portion of the elevation pin and supported in contact with the bottom of the elevation unit; an elastic supporting hole that is formed in an up-down direction in the center portion of the elevation pin and the second elastic supporting member is installed; and a guide groove spirally curved at a portion of the elastic supporting hole and guided by the guide.

Corners of the locking head of the present disclosure are curved. A luminescent member is installed on the locking head of the present disclosure. The guide groove of the present disclosure is spirally curved to rotate the locking head over 90 degrees.

The guide of the present disclosure includes: a guide pin inserted and fitted in a lower portion of the locker and guiding up-down movement of the locker; a guide projection protruding from a portion of the side of the guide pin and guiding rotation movement of the locker; and a fixing projection protruding from a bottom of the guide pin and fitted, fixed, and supported to the bottom plate.

A cut surface is formed at a first end of the fixing projection of the present disclosure such that the first end is fixed and supported in the bottom plate by surface contact.

As described above, according to the present disclosure, the apparatus includes a housing, a top plate, a bottom plate, an elevation unit, a locker, a guide, a first elastic supporting member, and a second elastic supporting member, thereby providing an effect that a container is automatically locked or unlocked by its own weight when it is loaded or unloaded, so it is possible to safely transport heavy containers always in a locked state and it is possible to prevent malfunction or poor function of the locker.

Further, since convex portions and concave portions are alternately and continuously formed on the housing, contact with the elevation unit is minimized, thereby providing an effect that it is possible to make up-down movement easy and minimize malfunction in up-down movement.

Further, a fixing-supporting hole and a drain hole are formed at the bottom plate, thereby providing an effect that it is possible to improve the fixing-supporting force for the guide and it is also possible to prevent damage to the bottom plate, the elevation unit, the locker, the guide, the first elastic supporting member, and the second elastic supporting member due to rainwater by draining rainwater flowing in the housing.

Further, the elevation unit includes a first elevator and a second elevator of which the inner surface is recessed to surround the circumference of the locker, thereby providing an effect that it is possible to make coupling between the elevation unit and the locker easy, increase the lifespan by improve a coupling-supporting force between the elevation unit and the locker and improving moving performance such that they move together.

Further, the corners of the locking head of the locker are curved and a luminescent member is installed on the locking head, thereby providing an effect that it is possible to prevent malfunction in locking and unlocking by the corners when loading or unloading a container and it is also possible to improve visibility when working at night.

Further, the spiral portion of the guide groove of the locker is spirally curved to rotate the locking head over 90 degrees, thereby providing an effect that it is possible to improve a force for rotating the locking head and improve reliability in rotation of the locking head.

DETAILED DESCRIPTION OF THE INVENTION

Hereinafter, a preferred embodiment of the present disclosure is described in detail with reference to the accompanying drawings.

Figure 1:
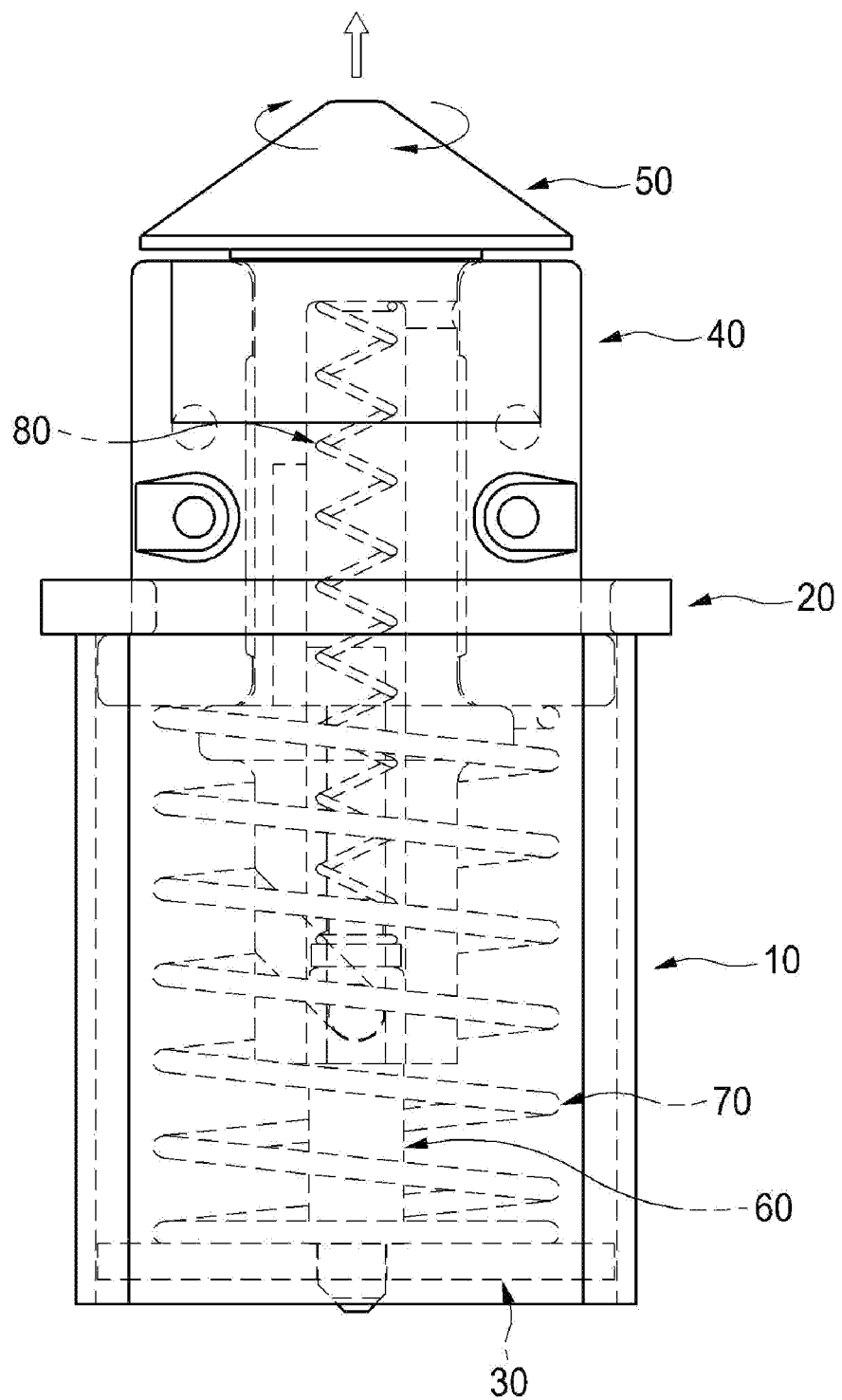
FIG. 1 is a configuration view showing an apparatus for automatically locking a container according to an embodiment of the present disclosure.
Figure 2:
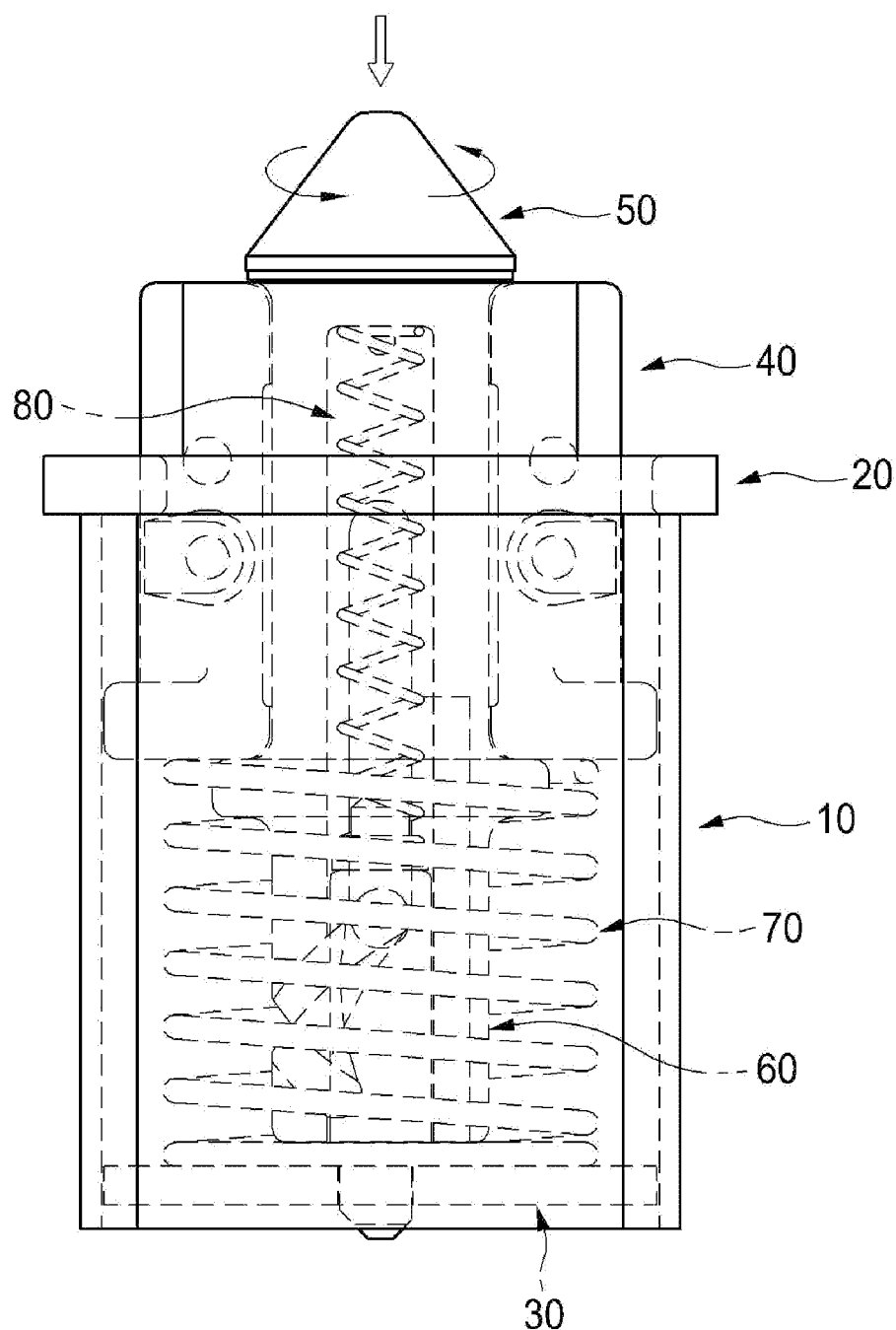
FIG. 2 is an exploded view showing the apparatus for automatically locking a container according to an embodiment of the present disclosure.
Figure 3:
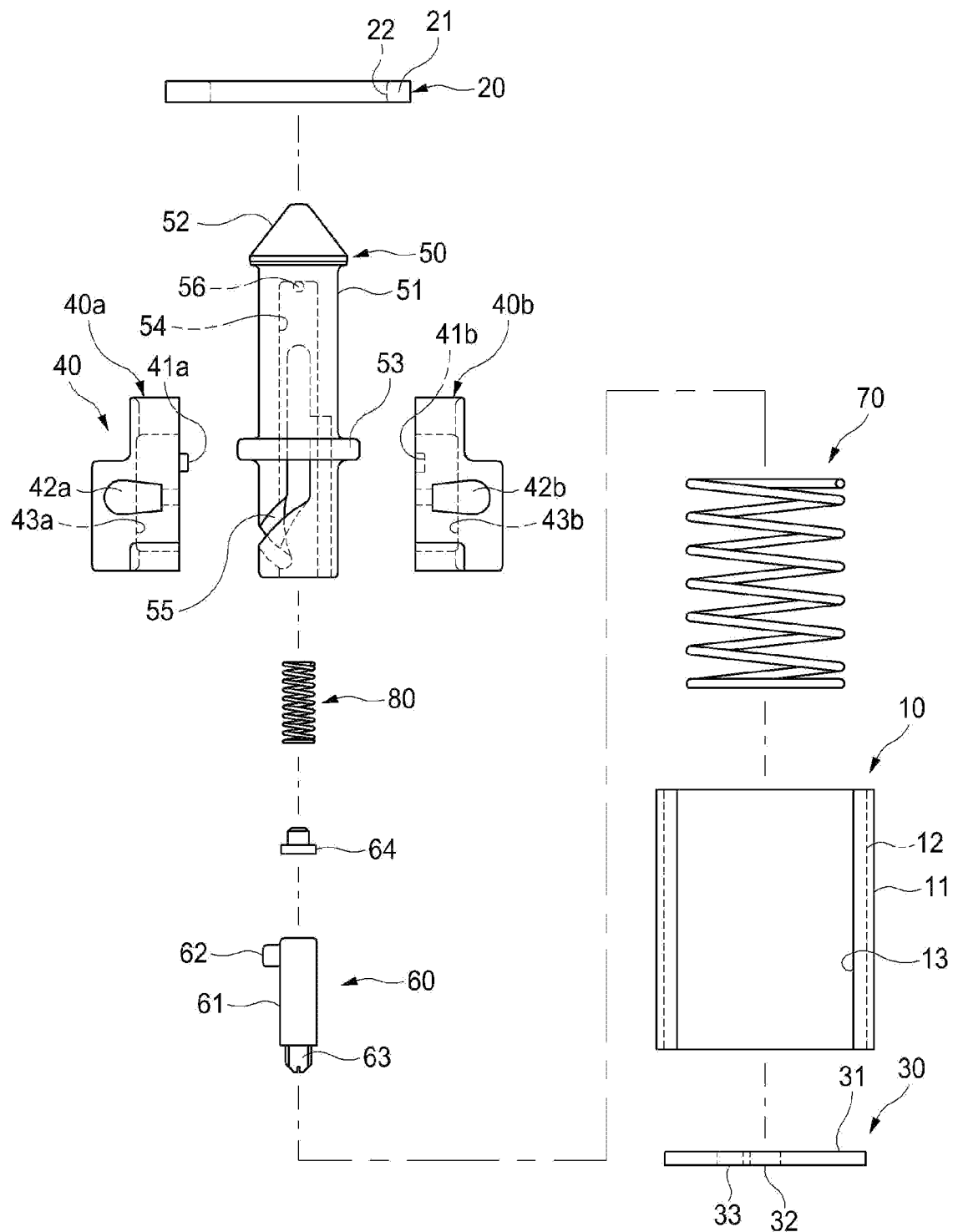
FIG. 3 is a state view showing a locked state of the apparatus for automatically locking a container according to an embodiment of the present disclosure.
Figure 4:
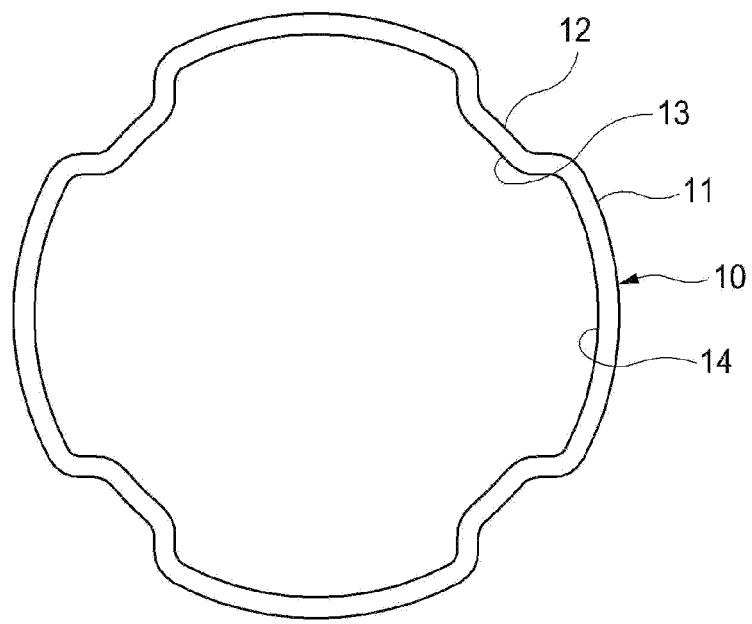
FIG. 4 is a plan view showing a housing of the apparatus for automatically locking a container according to an embodiment of the present disclosure.
Figure 5:
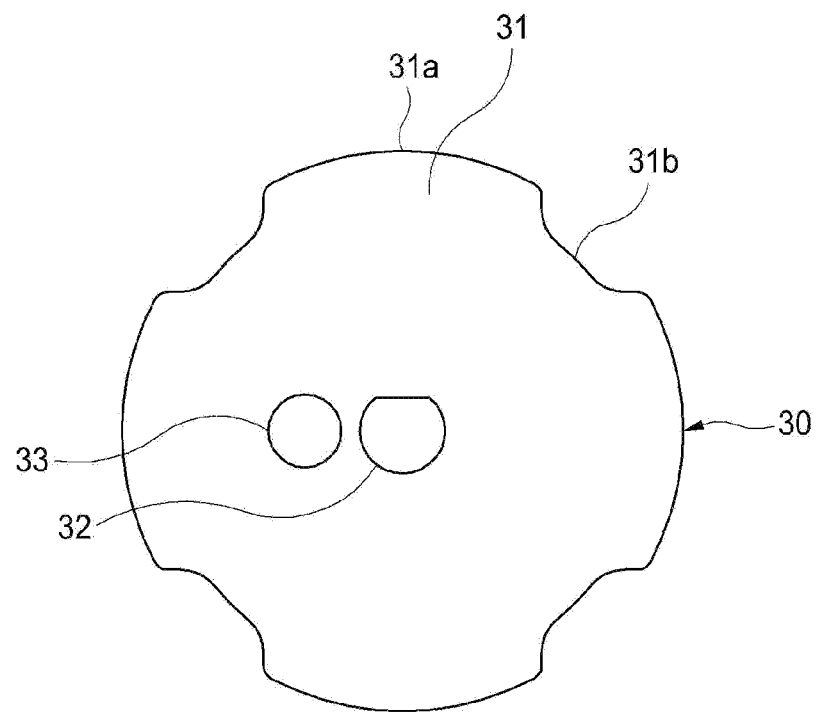
FIG. 5 is a plan view showing a bottom plate of the apparatus for automatically locking a container according to an embodiment of the present disclosure.
Figure 6:
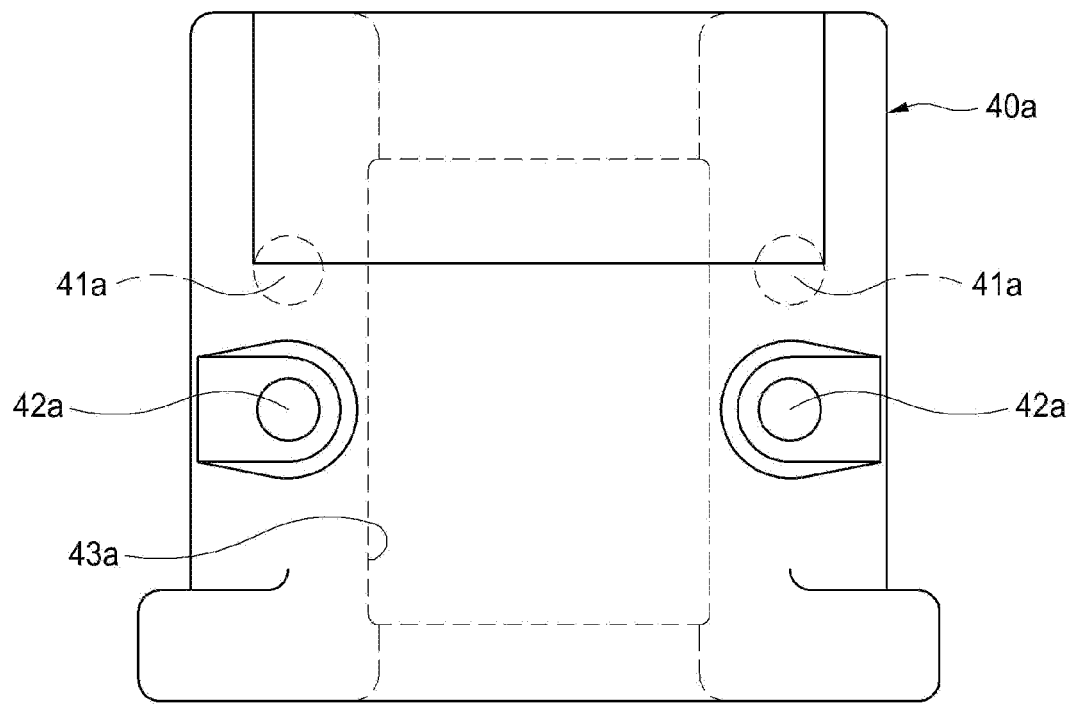
FIG. 6 is a front view showing a first elevator of an elevation unit of the apparatus for automatically locking a container according to an embodiment of the present disclosure.
Figure 7:
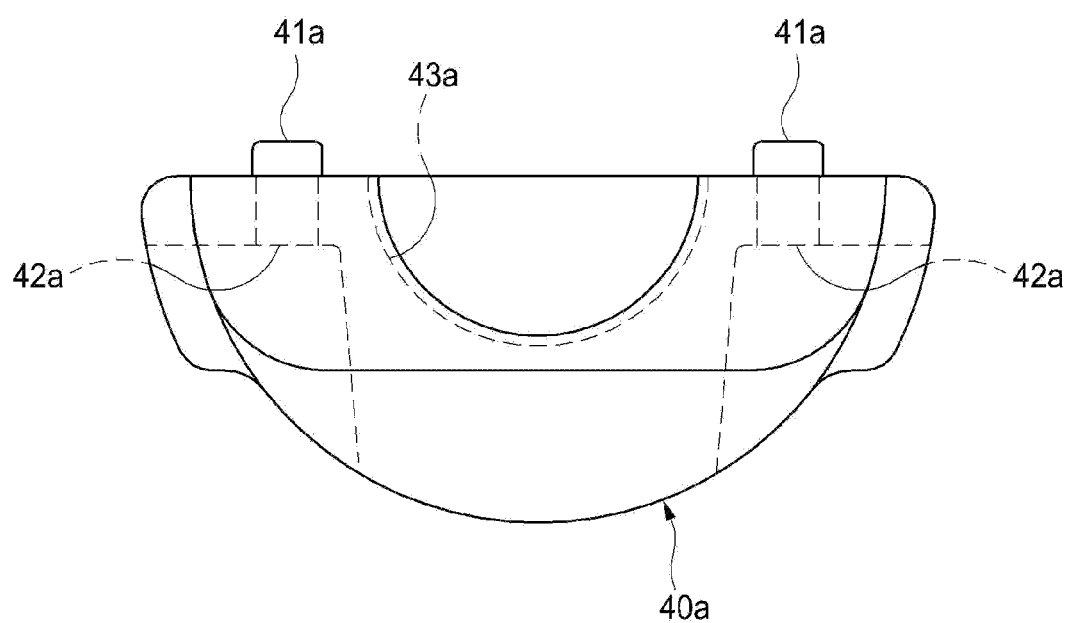
FIG. 7 is a plan view showing the first elevator of the elevation unit of the apparatus for automatically locking a container according to an embodiment of the present disclosure.
Figure 8:
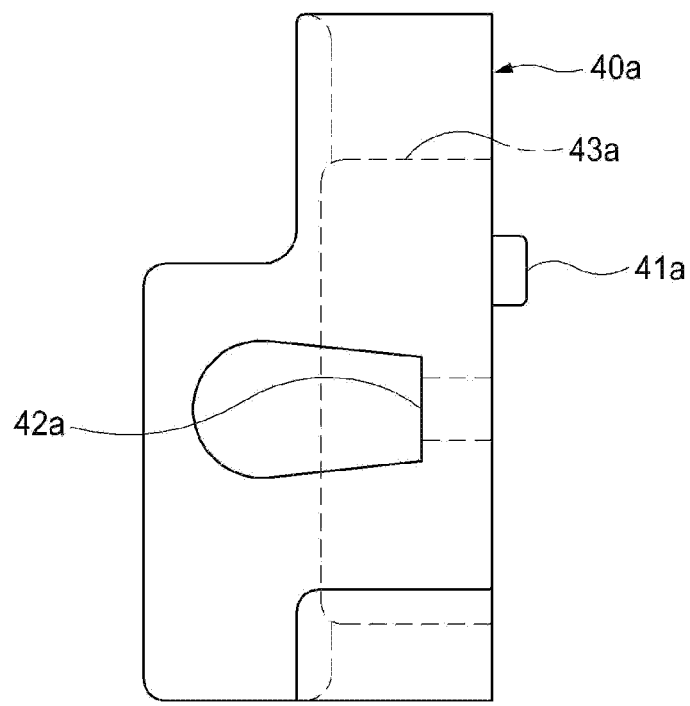
FIG. 8 is a side view showing the first elevator of the elevation unit of the apparatus for automatically locking a container according to an embodiment of the present disclosure.
Figure 9:
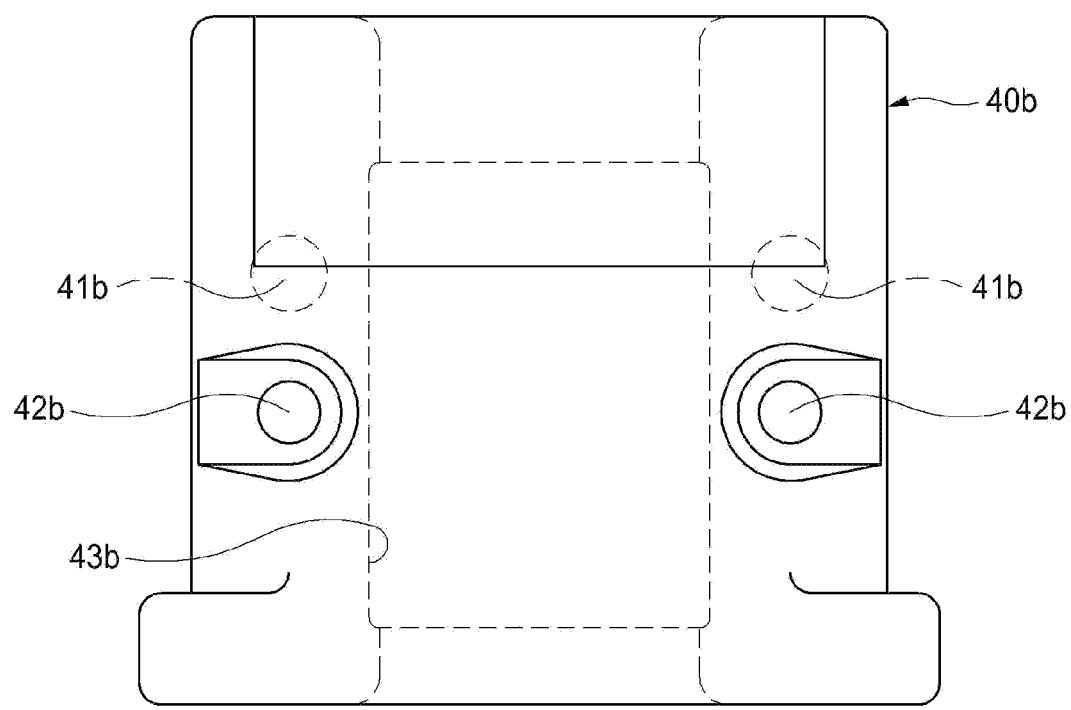
FIG. 9 is a front view showing a second elevator of the elevation unit of the apparatus for automatically locking a container according to an embodiment of the present disclosure.
Figure 10:
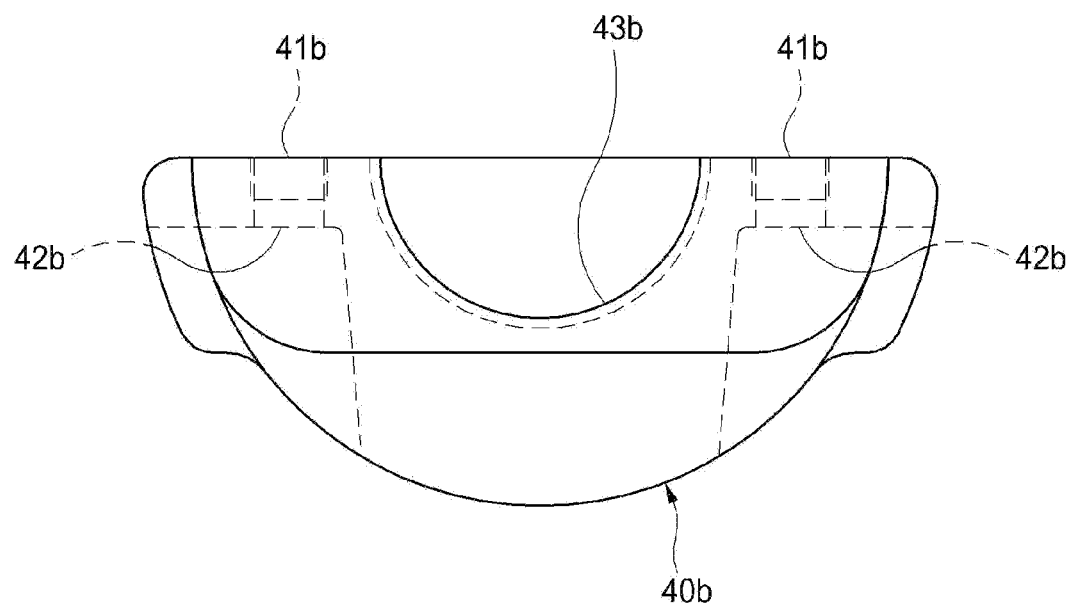
FIG. 10 is a top view showing the second elevator of the elevation unit of the apparatus for automatically locking a container according to an embodiment of the present disclosure.
Figure 11:
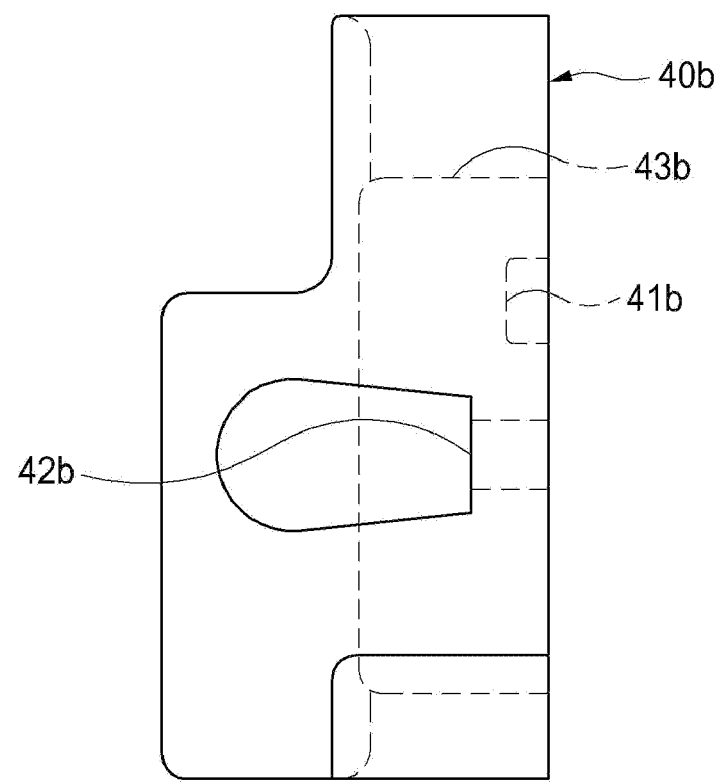
FIG. 11 is a side view showing the second elevator of the elevation unit of the apparatus for automatically locking a container according to an embodiment of the present disclosure.
Figure 12:
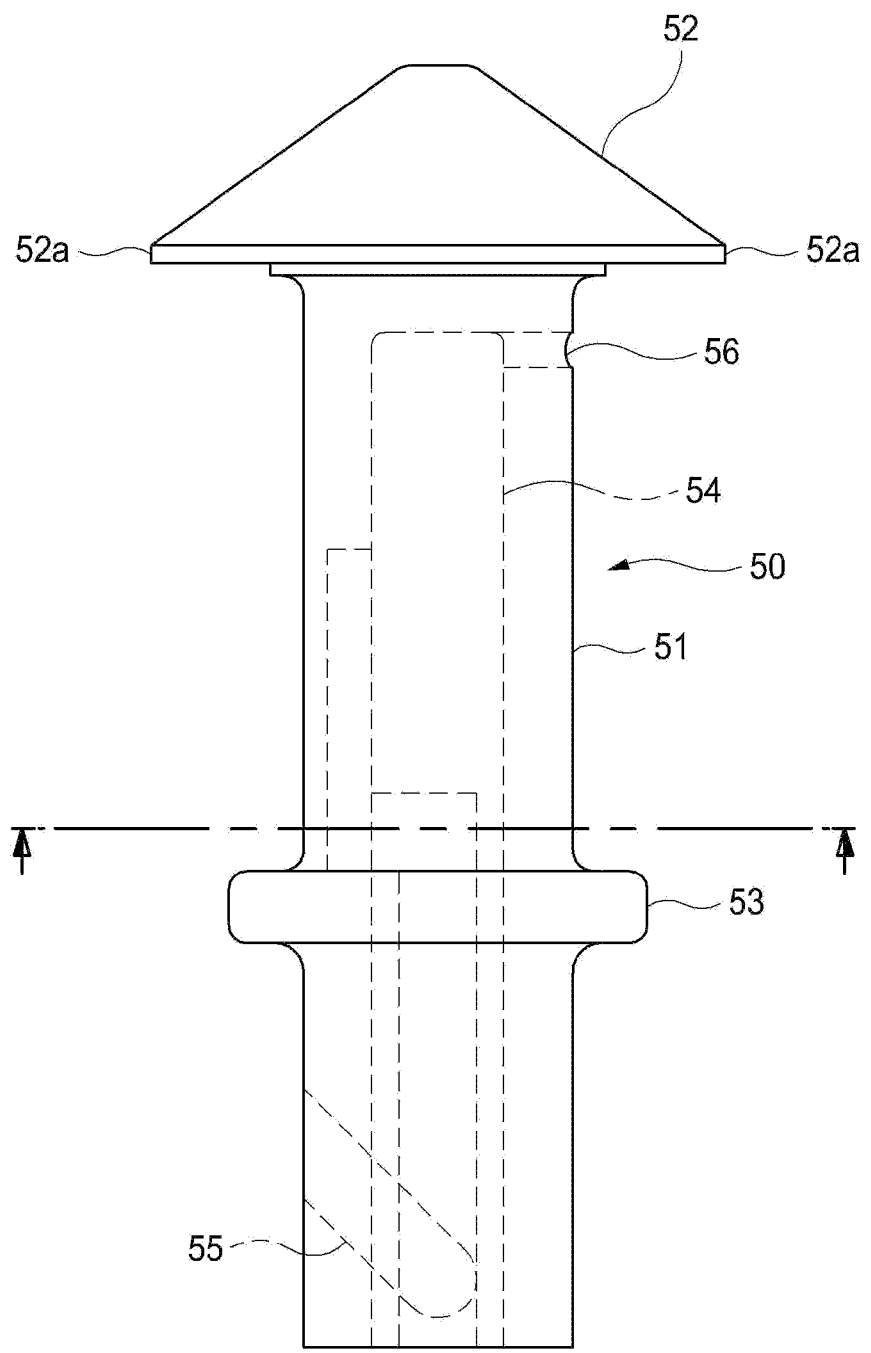
FIG. 12 is a front view showing a locker of the apparatus for automatically locking a container according to an embodiment of the present disclosure.
Figure 13:
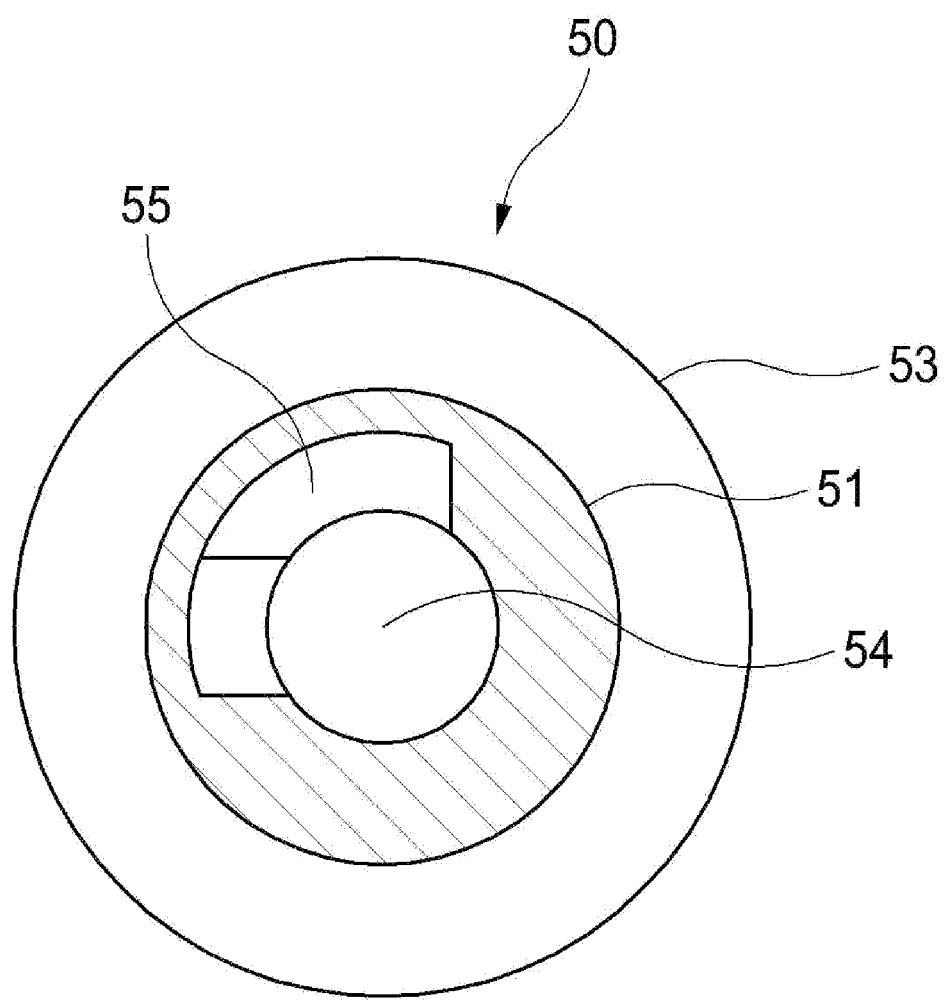
FIG. 13 is a cross-sectional view showing the locker of the apparatus for automatically locking a container according to an embodiment of the present disclosure.
Figure 14:
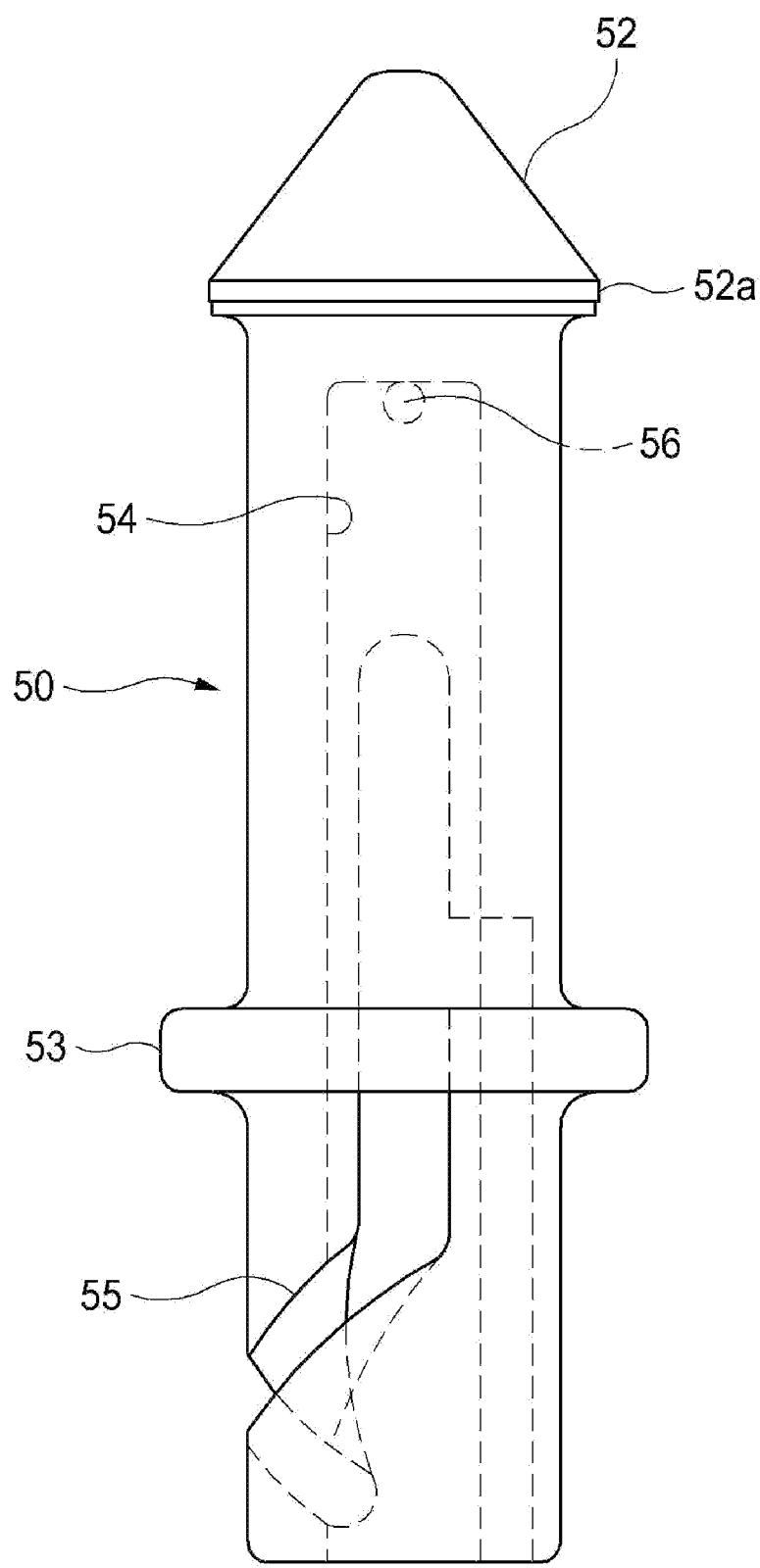
FIG. 14 is a side view showing the locker of the apparatus for automatically locking a container according to an embodiment of the present disclosure.
Figure 15:
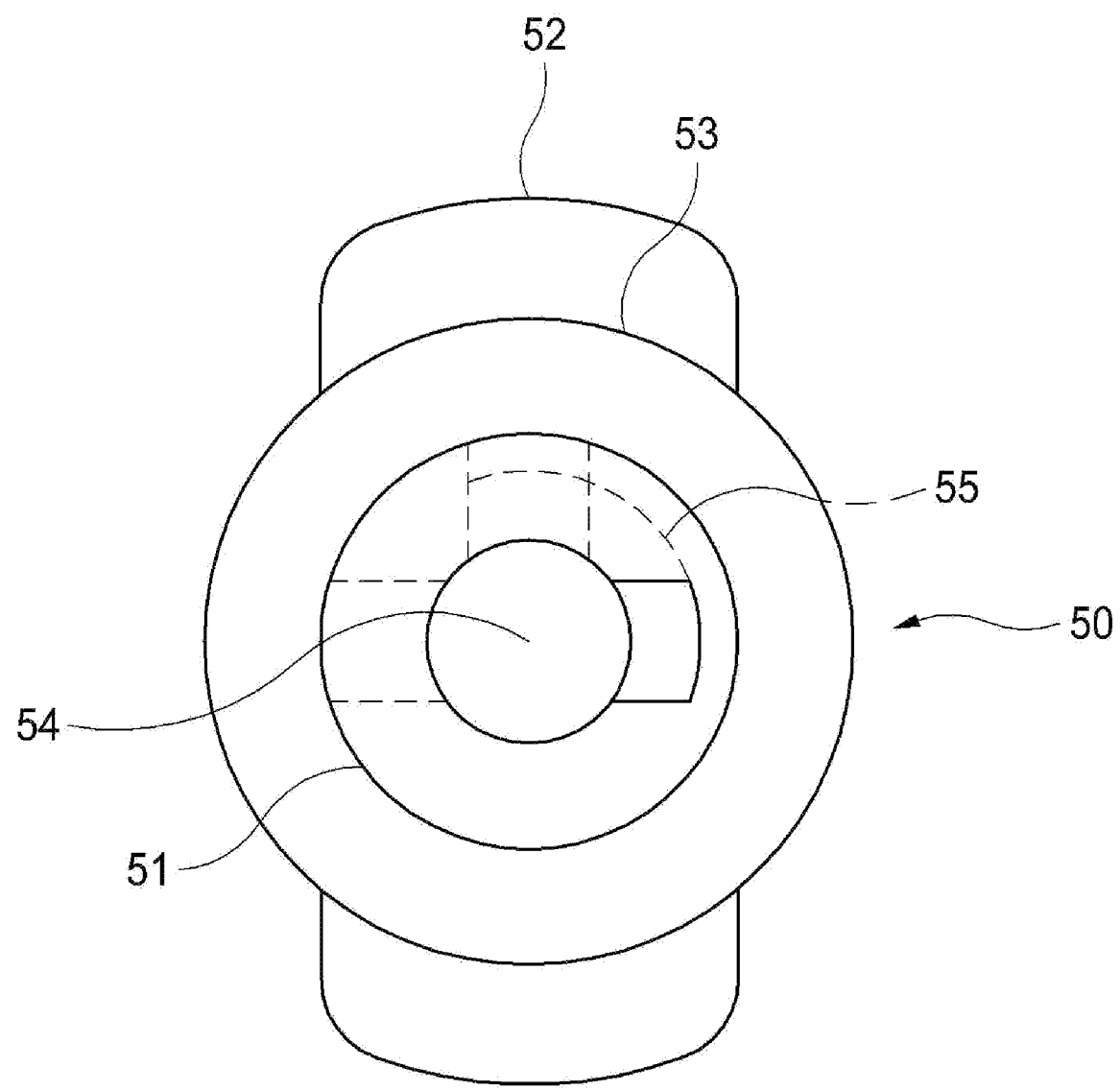
FIG. 15 is a bottom view showing the locker of the apparatus for automatically locking a container according to an embodiment of the present disclosure.
Figure 16:
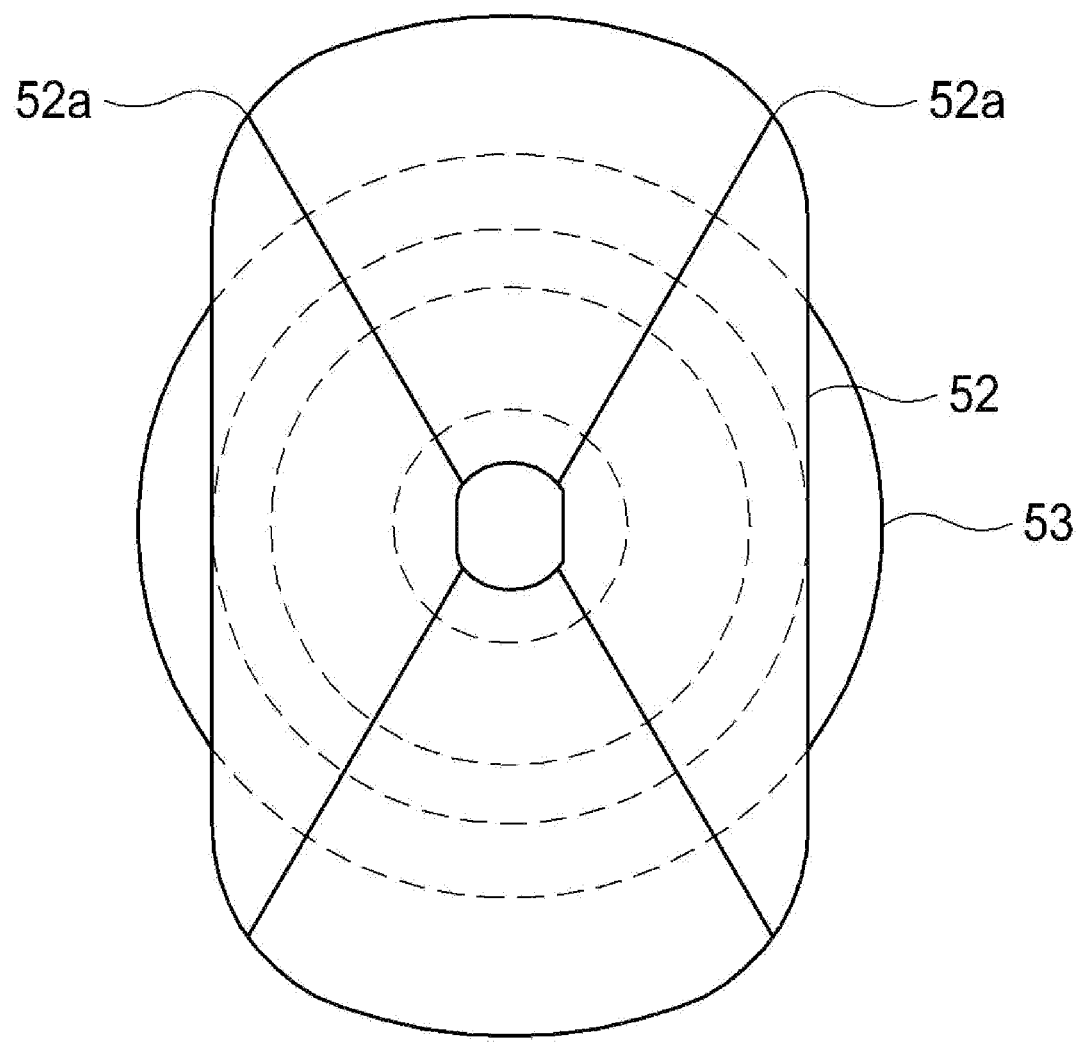
FIG. 16 is a top view showing the locker of the apparatus for automatically locking a container according to an embodiment of the present disclosure.
Figure 17:
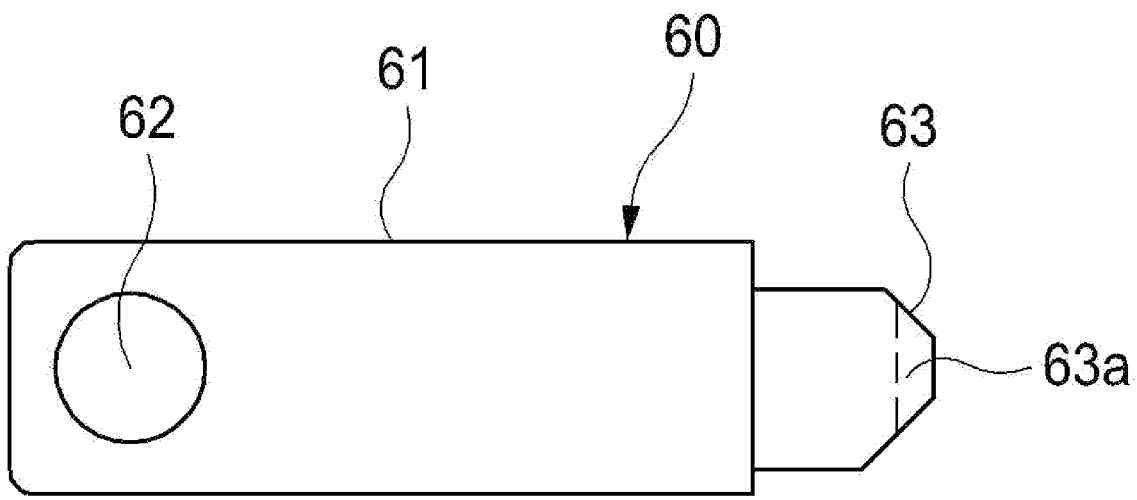
FIG. 17 is a front view showing a guide of the apparatus for automatically locking a container according to an embodiment of the present disclosure.
Figure 18:
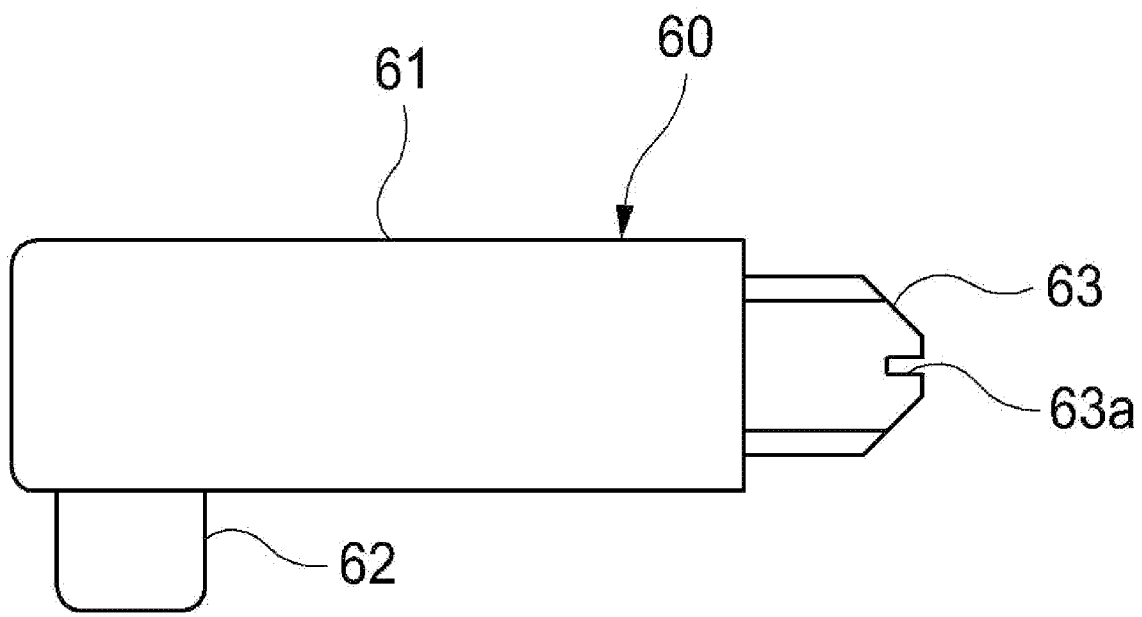
FIG. 18 is a side view showing the guide of the apparatus for automatically locking a container according to an embodiment of the present disclosure.
Figure 19:
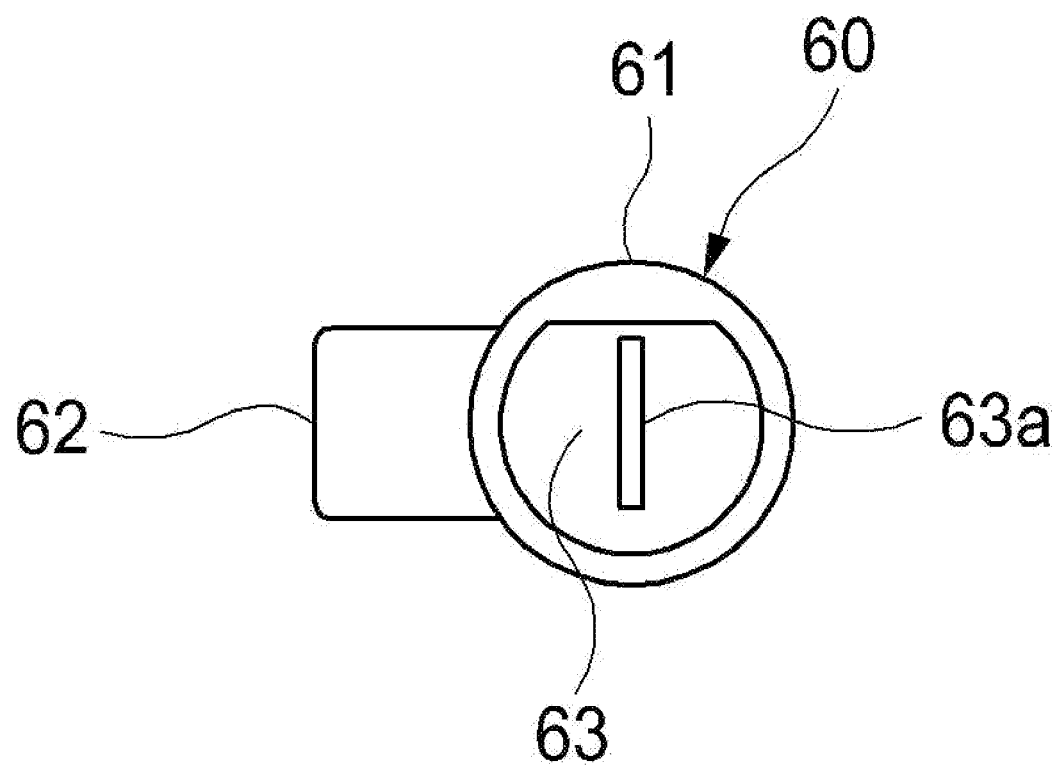
FIG. 19 is a bottom view showing the guide of the apparatus for automatically locking a container according to an embodiment of the present disclosure.
Figure 20:
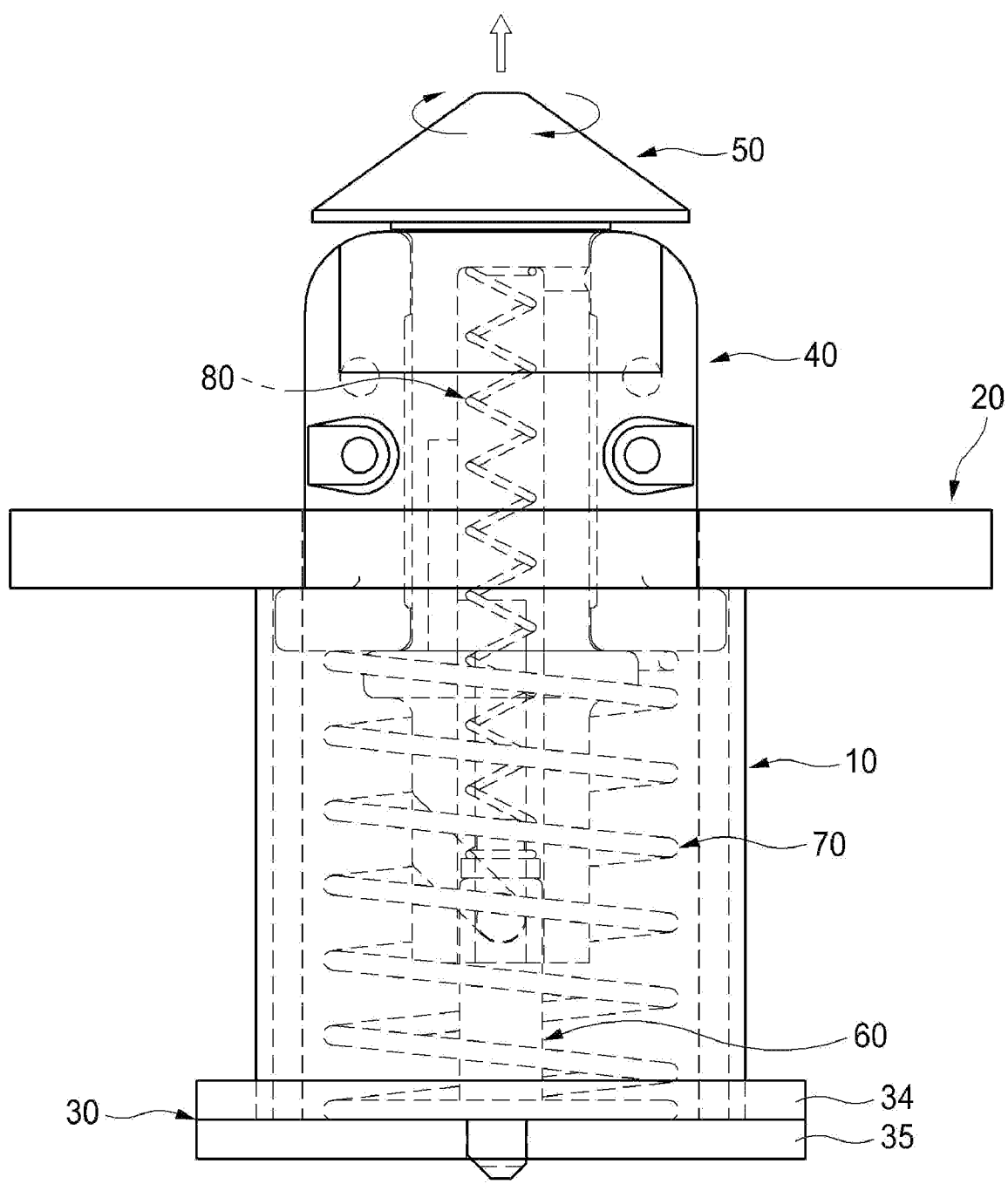
FIG. 20 is a configuration view showing another example of the apparatus for automatically locking a container according to an embodiment of the present disclosure.
Figure 21:
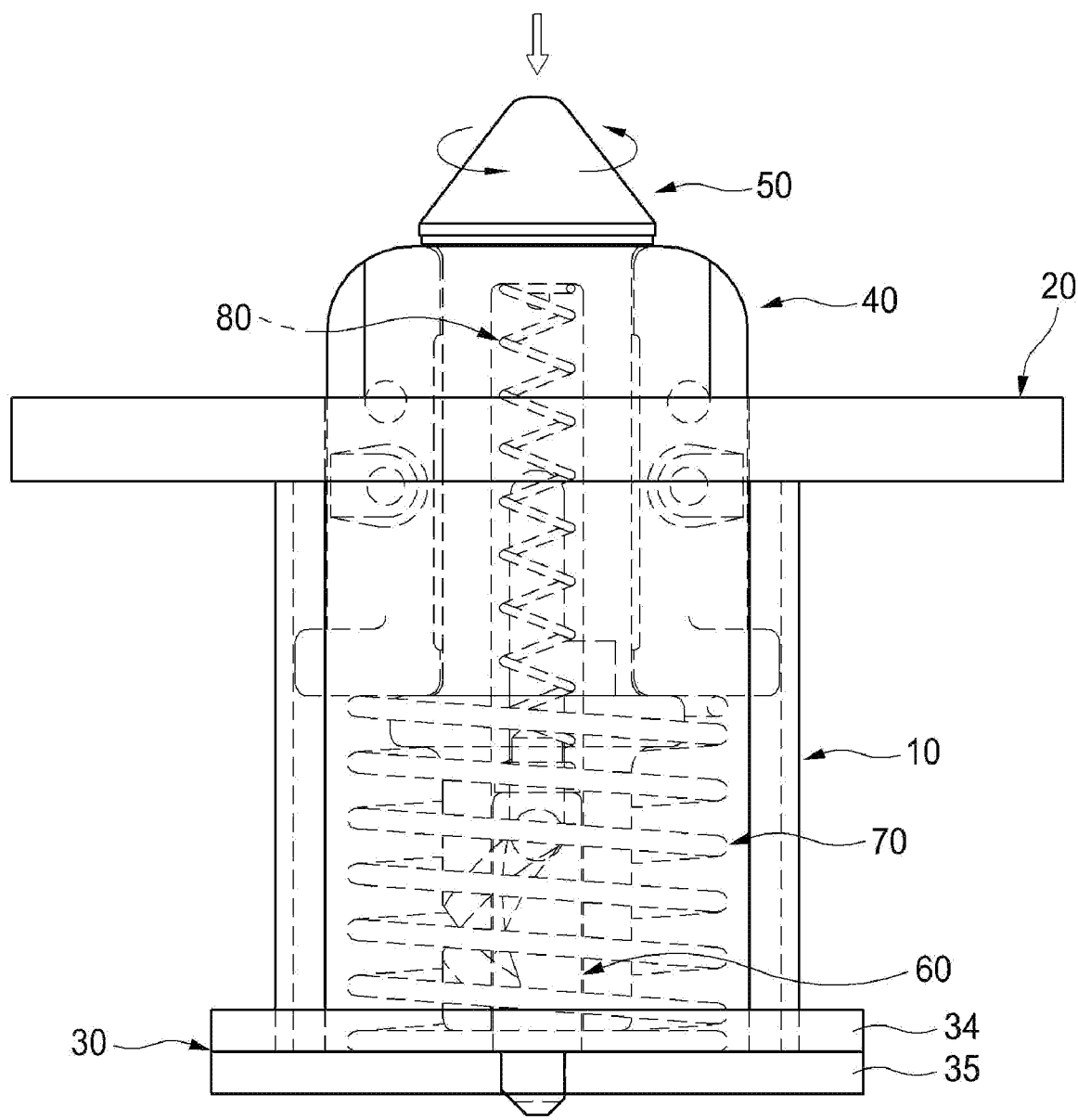
FIG. 21 is a state view showing a locked state of another example of the apparatus for automatically locking a container according to an embodiment of the present disclosure.
Figure 22:
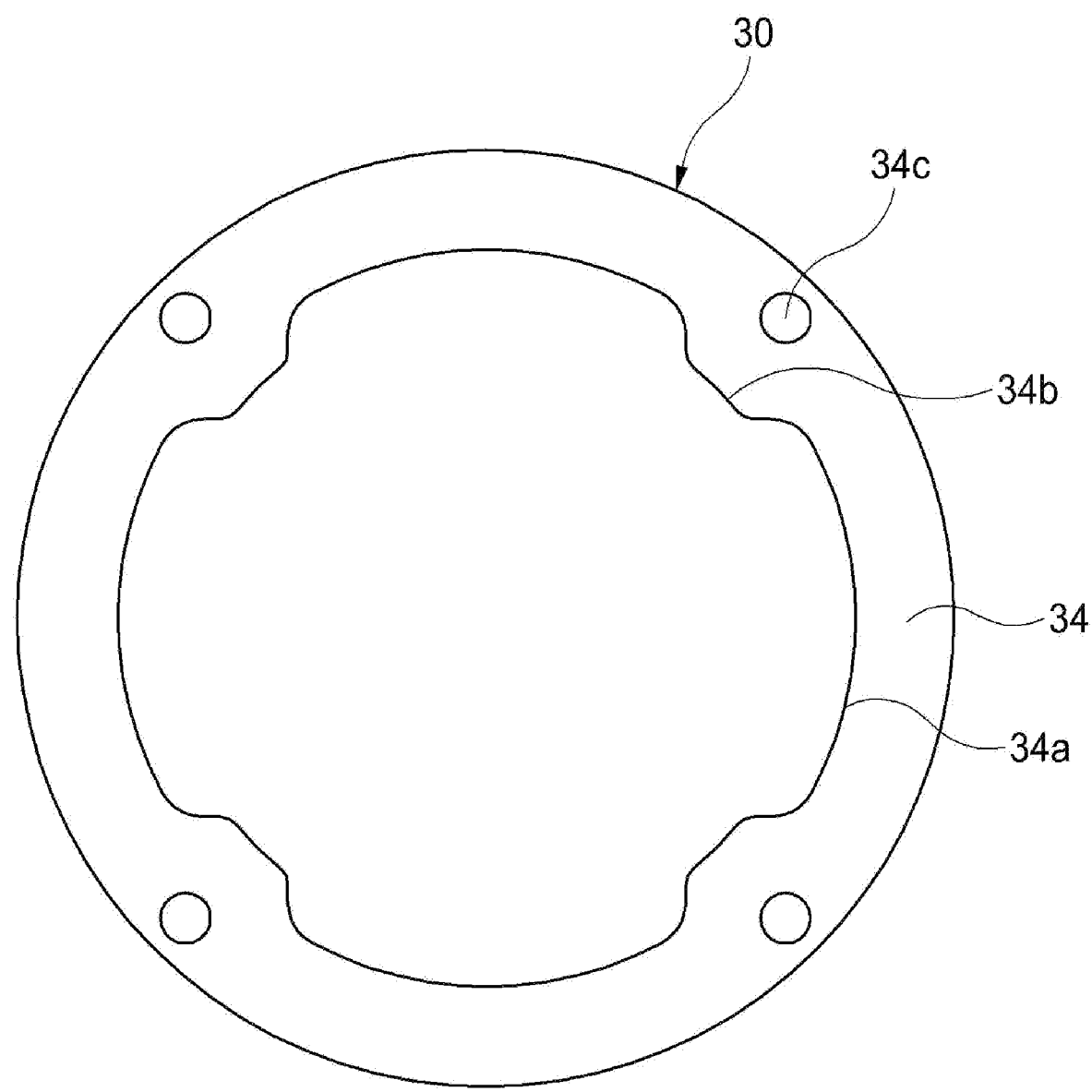
FIG. 22 is a configuration view showing a fixing cover of a bottom plate of another example of the apparatus for automatically locking a container according to an embodiment of the present disclosure.
Figure 23:
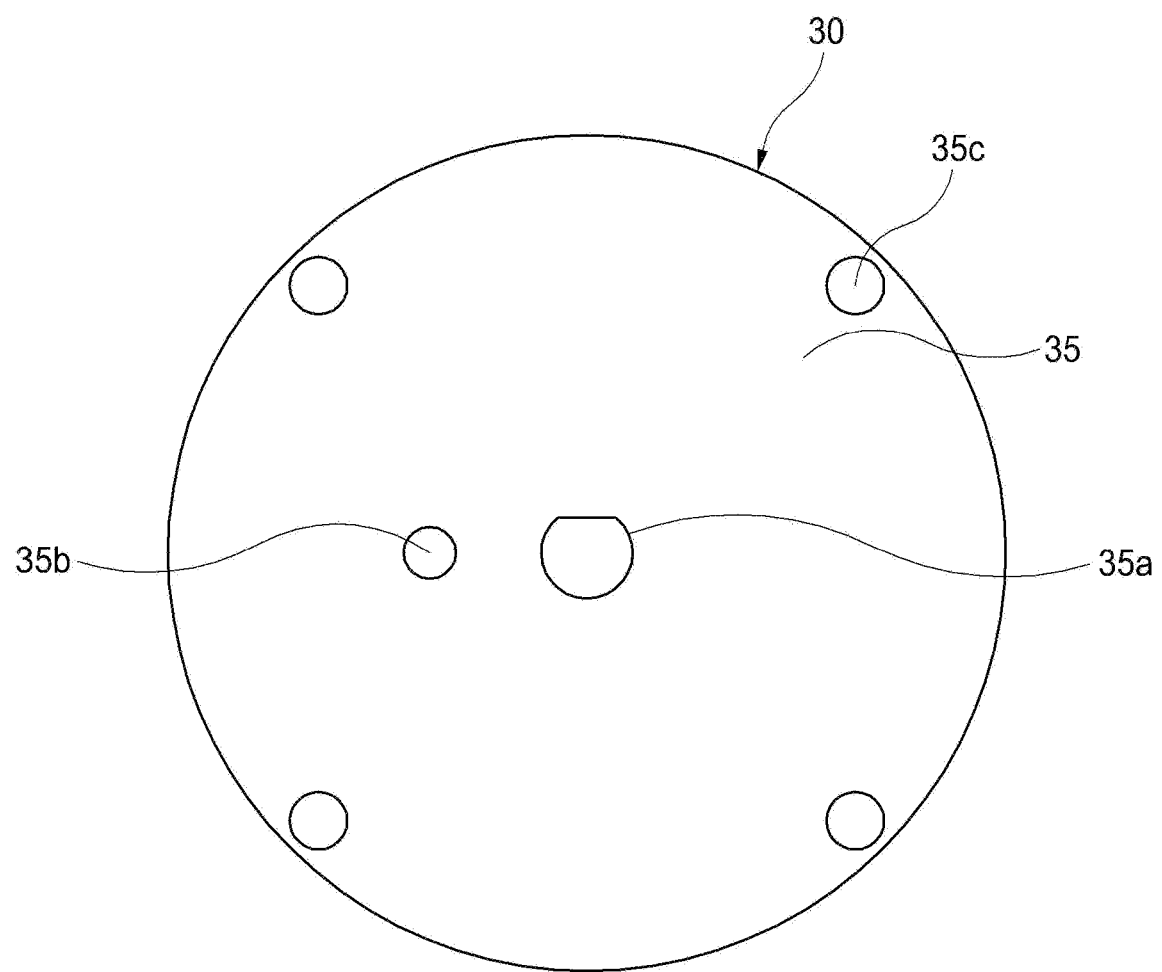
FIG. 23 is a configuration view showing a bottom plate cover of the bottom plate of another example of the apparatus for automatically locking a container according to an embodiment of the present disclosure.
Figure 24:
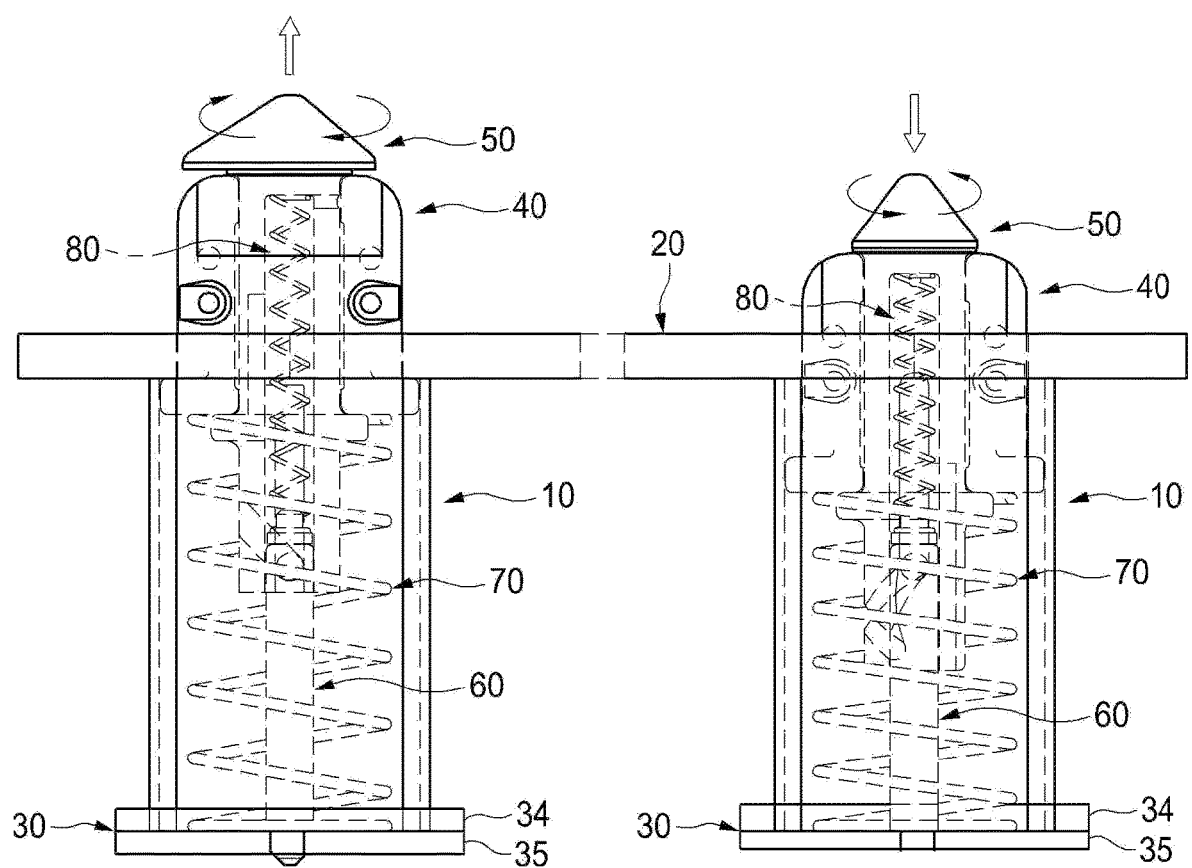
FIG. 24 is a configuration view showing a modified example of the apparatus for automatically locking a container according to an embodiment of the present disclosure.
Figure 25:
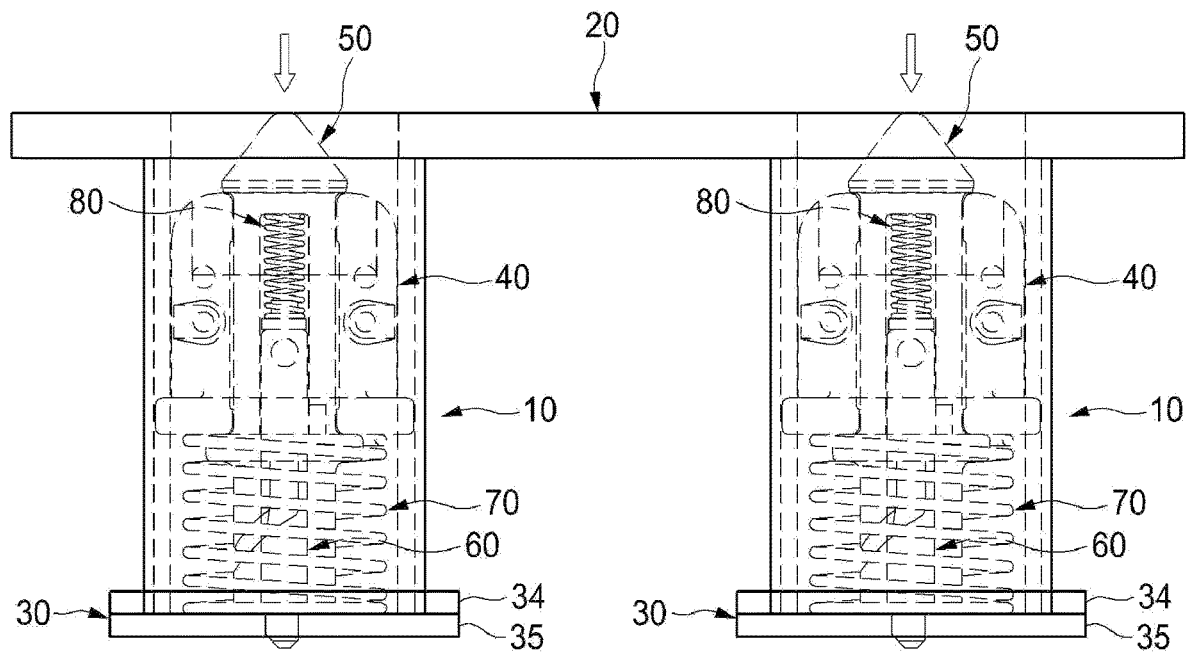
FIG. 25 is a state view showing an operation state of the modified example of the apparatus for automatically locking a container according to an embodiment of the present disclosure.
Figure 26:
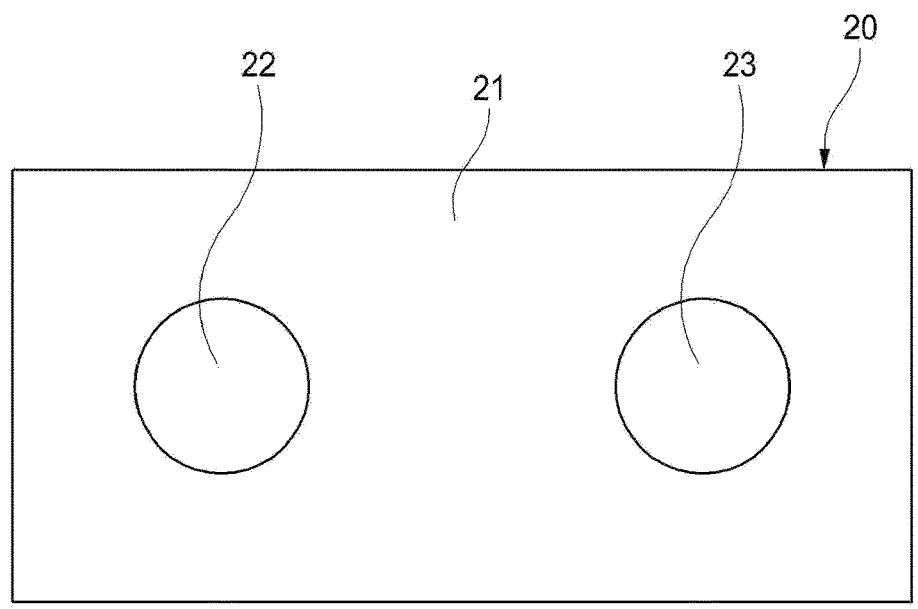
FIG. 26 is a configuration view showing a top plate of the modified example of the apparatus for automatically locking a container according to an embodiment of the present disclosure.

FIG. 1 is a configuration view showing an apparatus for automatically locking a container according to an embodiment of the present disclosure, FIG. 2 is an exploded view showing the apparatus for automatically locking a container according to an embodiment of the present disclosure, FIG. 3 is a state view showing a locked state of the apparatus for automatically locking a container according to an embodiment of the present disclosure, FIG. 4 is a plan view showing a housing of the apparatus for automatically locking a container according to an embodiment of the present disclosure, FIG. 5 is a plan view showing a bottom plate of the apparatus for automatically locking a container according to an embodiment of the present disclosure, FIG. 6 is a front view showing a first elevator of an elevation unit of the apparatus for automatically locking a container according to an embodiment of the present disclosure, FIG. 7 is a plan view showing the first elevator of the elevation unit of the apparatus for automatically locking a container according to an embodiment of the present disclosure, FIG. 8 is a side view showing the first elevator of the elevation unit of the apparatus for automatically locking a container according to an embodiment of the present disclosure, FIG. 9 is a front view showing a second elevator of the elevation unit of the apparatus for automatically locking a container according to an embodiment of the present disclosure, FIG. 10 is a top view showing the second elevator of the elevation unit of the apparatus for automatically locking a container according to an embodiment of the present disclosure, FIG. 11 is a side view showing the second elevator of the elevation unit of the apparatus for automatically locking a container according to an embodiment of the present disclosure, FIG. 12 is a front view showing a locker of the apparatus for automatically locking a container according to an embodiment of the present disclosure, FIG. 13 is a cross-sectional view showing the locker of the apparatus for automatically locking a container according to an embodiment of the present disclosure, FIG. 14 is a side view showing the locker of the apparatus for automatically locking a container according to an embodiment of the present disclosure, FIG. 15 is a bottom view showing the locker of the apparatus for automatically locking a container according to an embodiment of the present disclosure, FIG. 16 is a top view showing the locker of the apparatus for automatically locking a container according to an embodiment of the present disclosure, FIG. 17 is a front view showing a guide of the apparatus for automatically locking a container according to an embodiment of the present disclosure, FIG. 18 is a side view showing the guide of the apparatus for automatically locking a container according to an embodiment of the present disclosure, FIG. 19 is a bottom view showing the guide of the apparatus for automatically locking a container according to an embodiment of the present disclosure, FIG. 20 is a configuration view showing another example of the apparatus for automatically locking a container according to an embodiment of the present disclosure, FIG. 21 is a state view showing a locked state of another example of the apparatus for automatically locking a container according to an embodiment of the present disclosure, FIG. 22 is a configuration view showing a fixing cover of a bottom plate of another example of the apparatus for automatically locking a container according to an embodiment of the present disclosure, FIG. 23 is a configuration view showing a bottom plate cover of the bottom plate of another example of the apparatus for automatically locking a container according to an embodiment of the present disclosure, FIG. 24 is a configuration view showing a modified example of the apparatus for automatically locking a container according to an embodiment of the present disclosure, FIG. 25 is a state view showing an operation state of the modified example of the apparatus for automatically locking a container according to an embodiment of the present disclosure, and FIG. 26 is a configuration view showing a top plate of the modified example of the apparatus for automatically locking a container according to an embodiment of the present disclosure.

As shown in FIGS. 1 to 3, an apparatus for automatically locking a container according to the present invention is an apparatus for automatically locking a container that includes a housing 10, a top plate 20, a bottom plate 30, an elevation unit 40, a locker 50, a guide 60, a first elastic support 70, and a second elastic support 80, and locks and unlocks a container loaded on a trailer or a railroad vehicle.

The housing 10 is a cylindrical housing member of which the internal cross-section is bent in a curved shape, convex portions and concave portions are repeatedly extended a prominence-recession shape around the surface of the housing, and as shown in FIG. 4, the housing 10 has protrusions 11, recessions 12, inner protruding surfaces 13, and inner recessed surfaces 14.

The protrusions 11, which are a plurality of protrusions formed with regular intervals circumferentially on the outer side and protruding outward, protrude to form convex portions circumferentially on the outer side and reduce a contact area when the elevation unit 40 coupled in the housing 10 moves up and down.

The recessions 12, which are a plurality of recessions extending between the protrusions 11 and recessed inward, are recessed to form concave portions circumferentially on the outer side of the housing and reduce a contact area when the elevation unit 40 coupled in the housing 10 moves up and down.

The inner protrusions 13, which are a plurality of protrusions formed with regular intervals circumferentially on the inner side and protruding inward, protrude to form convex portions circumferentially on the inner side and reduce a contact area when the elevation unit 40 coupled in the housing 10 moves up and down.

The inner recessed surfaces 14, which are a plurality of recessions extending between the inner protrusions 13 and recessed inward, are recessed to form concave portions circumferentially on the inner side of the housing and reduce a contact area when the elevation unit 40 coupled in the housing 10 moves up and down.

The top plate 20, which is a top plate member installed to cover the top of the housing 10, is fastened and fixed to the top of the housing 10 by bolts and has a top cover 21 and an elevation hole 22.

The top cover 21, which is a cover member fastened and fixed to the top of the housing 10 by fasteners such as bolts to cover the top of the housing 10, is a substantially rectangular plate and supports the elevation unit 40 coupled in the housing 10.

The elevation hole 22, which is a hole formed through the center portion of the top cover 21, is a supporting hole supporting the elevation unit 40 and the locker 50, which are installed to move up and down in the housing 10, to move up and down together, and restricts up-down movement of the elevation unit 40 and the locker 50 by coming in contact with a step formed around the lower portion of the elevation unit 40.

As shown in FIGS. 24 to 26, a top plate 20 of another example of the apparatus for automatically locking a container of the present disclosure is a top plate member installed to cover the tops of both of two housings 10, is fastened and fixed to both of a portion and another portion of the top of the housings 10 by bolts, and has a top cover 21, a first elevation hole 22, and a second elevation hole 23.

The top cover 21, which is a cover member fastened and fixed to both of a portion and another portion of the top of the housings 10 by fasteners such as bolts to cover the tops of both of the housings 10, is a substantially rectangular plate and supports elevation units 40 coupled in the housings 10.

The first elevation hole 22, which is a hole formed through a portion of the top cover 21, is a supporting hole supporting an elevation unit 40 and a locker 50, which are installed to move up and down in a housing 10, to move up and down together, and restricts up-down movement of the elevation unit 40 and the locker 50 by coming in contact with a step formed around the lower portion of the elevation unit 40.

The second elevation hole 22, which is a hole formed through another portion of the top cover 21, is a supporting hole supporting an elevation unit 40 and a locker 50, which are installed to move up and down in a housing 10, to move up and down together, and restricts up-down movement of the elevation unit 40 and the locker 50 by coming in contact with a step formed around the lower portion of the elevation unit 40.

The bottom plate 30, which is a bottom plate member installed to cover the bottom of the housing 10, is fastened and fixed to the bottom of the housing 10 by bolts, and as shown in FIG. 5, has a bottom cover 31, a fixing-supporting hole 32, and a drain hole 33.

The bottom cover 31, which is a cover member fastened and fixed to the bottom of the housing 10 by fasteners such as bolts to cover the bottom of the housing 10, has a circumference curved in a prominence-recession shape to substantially correspond to the shape of the housing 10, and supports the guide 60 coupled in the housing 10.

The fixing-supporting hole 32, which is a hole that is formed through the center portion of the bottom cover 31 and in which the guide 60 is fitted and fixed, is formed substantially in a circular shape with one cut side, and is fitted and supported to prevent the guide 60 from shaking left and right.

The drain hole 33, which is a discharging component formed at a portion of the bottom cover 31 and discharging rainwater flowing in the housing 10, is formed through a side of the bottom cover 31 and discharges rainwater flowing inside.

As shown in FIGS. 20 to 25, a bottom plate 30 of another example of the apparatus for automatically locking a container of the present disclosure is a bottom plate member installed to cover the bottom of the housing 10, is fastened and fixed to the bottom of the housing 10 by bolts, and has a fixing cover 34 and a bottom plate cover 35.

The fixing cover 34, which is a cover member fastened and fixed to the bottom of the housing 10 together with the bottom plate cover 35 by fasteners such as bolts to cover the bottom of the housing 10, has inner recessed surfaces 35a (34a??), inner protruding surfaces 35b, and fastening holes 35c.

The inner recessed surfaces 35a, which are a plurality of protrusions formed with regular intervals circumferentially on the inner side and protruding inward, protrude to form convex portions circumferentially on the inner side and reduce a contact area when the elevation unit 40 coupled in the housing 10 moves up and down.

The inner protruding surfaces 35b, which are a plurality of recessions extending between the inner protrusions 13 and recessed inward, are recessed to form concave portions circumferentially on the inner side of the housing and reduce a contact area when the elevation unit 40 coupled in the housing 10 moves up and down.

The fastening holes 35c, which are holes formed with regular intervals through the edge portion of the fixing cover 34 and fastened and fixed by fasteners such as bolts, couple and fix the fixing cover 34 and the bottom plate cover 35 to the bottom of the housing 10.

The bottom plate cover 35, which is a cover member fastened and fixed to the bottom of the housing 10 together with the fixing cover 34 by fasteners such as bolts to cover the bottom of the housing 10, is formed in a substantially circular shape, supports the guide 60 coupled in the housing 10, and has a supporting hole 35a, a discharge hole 35b, and fixing holes 35c.

The supporting hole 35a, which is a hole that is formed through the center portion of the bottom plate cover 35 and in which the guide 60 is fitted and fixed, is formed substantially in a circular shape with one cut side, and is fitted and supported to prevent the guide 60 from shaking left and right.

The discharge hole 35b, which is a discharging component formed at a portion of the bottom plate cover 35 and discharging rainwater flowing in the housing 10, is formed through a side of the bottom plate cover 35 and discharges rainwater flowing inside.

The fixing holes 35c, which are holes formed with regular intervals through the edge portion of the bottom plate cover 35 and fastened and fixed by fasteners such as bolts, couple and fix the fixing cover 34 and the bottom plate cover 35 to the bottom of the housing 10.

The elevation unit 40, which is an elevation member installed to move up and down in the housing 10, as shown in FIGS. 6 to 11, is coupled to surround the circumference of the locker 50 at a portion and another portion of the side of the locker 50, and includes a first elevator 40a and a second elevator 40b.

The first elevator 40a, which is an elevation body that has fitting projections on both ends and has a recessed inner surface to surround the circumference of a portion of the locker 50, has first fitting projections 41a, first coupling grooves 42a, and a first coupling hole 43a.

The first fitting projections 41a, which are fitting components protruding from both ends of the side of the first elevator 40a, protrude to maintain a coupling position and are fitted in the second elevator 40b when the first elevator 40a and the second elevator 40b are combined.

The first coupling grooves 42a are fitting components recessed at both ends of the side of the first elevator 40a, and fasteners such as bolts are installed when the first elevator 40a and the second elevator 40b are combined, thereby fastening and fixing the first elevator 40a and the second elevator 40b to each other.

The first coupling hole 43a, which is a coupling component recessed longitudinally up and down on the side of the first elevator 40a, is recessed in a semicircular shape to surround the locker 50 between first elevator 40a and the second elevator 40b when the elevators are combined.

Further, protrusions are formed between the upper end and the lower end of the first coupling hole 43a and a recession is formed therebetween, thereby reducing a contact area with the locker 50 coupled thereto and making rotation movement of the locker 50 easy.

The second elevator 40b, which is an elevation body that has fitting grooves, to which the fitting projections are coupled, at both ends to be coupled to the first elevator and that has a recessed inner surface to surround another portion of the locker 50, and has second fitting projections 41b, second coupling grooves 42b, and a second coupling hole 43b.

The second coupling grooves 42b, which are grooves recessed at both ends of the side of the second elevator 40b, are recessed to maintain a coupling position when the first elevator 40a and the second elevator 40b are combined, and the first fitting projections 41a of the first elevator 40a are fitted therein.

The second coupling grooves 42b are fitting components recessed at both ends of the side of the second elevator 40b, and fasteners such as bolts are installed when the first elevator 40a and the second elevator 40b are combined, thereby fastening and fixing the first elevator 40a and the second elevator 40b to each other.

The second coupling hole 43b, which is a coupling component recessed longitudinally up and down on the side of the second elevator 40b, is recessed in a semicircular shape to surround the locker 50 between first elevator 40a and the second elevator 40b when the elevators are combined.

Further, protrusions are formed between the upper end and the lower end of the second coupling hole 43b and a recession is formed therebetween, thereby reducing a contact area with the locker 50 coupled thereto and making rotation movement of the locker 50 easy.

The locker 50, which is a locking member installed in the elevation unit 40 to move up and down together and rotating left and right to lock and unlock a container, as shown in FIGS. 12 to 16, has an elevation pin 51, a locking head 52, a stopping step 53, an elastic supporting hole 54, a guide groove 55, and a gas hole 56.

The elevation pin 51, which is a pin member coupling in the elevation unit 40 to move up and down together, is formed in a cylindrical shape to be coupled and fixed in a recession formed between the first elevator 40a and the second elevator 40b.

The locking head 52, which is a locking member protruding in a rectangular cone shape from the upper end of the elevation pin 51, is formed in a rectangular cone shape to be fitted in elliptical fixing holes, which are formed at corner blocks installed at upper end lower corners of a container, and fixed and supported by rotation.

Four corners 52a of the locking head 52 are curved to be easily coupled to corner blocks of a container, and of course, a luminescent member may also be installed at the upper portion of the locking head 52 to improve visibility at night.

The stopping step 53, which is a stopping component protruding around a lower portion of the elevation pin 51 and supported in contact with the bottom of the elevation unit 40, fixes and supports the circumference of the lower portion of the elevation pin 51 coupled between the first elevator 40a and the second elevator 40b through contact.

The elastic supporting hole 54, which is a hole that is formed in the up-down direction in the center portion of the elevation pin 51 and in which a second elastic supporting member 80 is installed, provides an up-down force so that the locking head 52 easily moves up and down and rotates.

The guide groove 55, which is a groove spirally curved at a portion of the elastic supporting hole 54 and guided by the guide 60, provides both a rotation force and an up-down force so that the locking head 52 easily moves up and down and rotates. It is more preferable that the guide groove 55 is spirally curved to rotate the locking head 52 over 90 degrees.

The gas hole 56, which is a hole formed at a portion of the upper portion through the side of the elevation pin 51 and communicating with the elastic supporting hole 54, discharges internal air to the outside to prevent compression of air in the elastic supporting hole 54 from interfering the elevation pin 51 moving up and down.

The guide 60, which is a guide member that is erect at the center of the bottom plate 30, inserted in the lower portion of the locker 50, and guiding up-down movement and rotation movement of the locker 50, as shown in FIGS. 17 to 19, has a guide pin 61, a guide projection 62, a fixing projection 63, and a guide member 64.

The guide pin 61, which is a pin member inserted and fitted in the lower portion of the locker 50 and guiding up-down movement of the locker 50, is fitted and fixed in the fixing-supporting hole 32 of the bottom plate 30 and guides up-down movement and rotation movement of the locker 50.

The guide projection 62, which is a projection protruding from a portion of the side of the guide pin 61 and guiding rotation movement of the locker 50, is fitted in the guide groove 55 of the locker 50 to spirally slide and guides rotation movement and up-down movement of the locker 50.

The fixing projection 63, which is a projection protruding from the bottom of the guide pin 61 and fitted, fixed, and supported to the bottom plate 30, is fitted and fixed in the fixing-supporting hole 32 of the bottom plate 30. It is preferable that a cut surface is formed at a first end of the fixing projection 63 such that the first end is fitted, fixed and supported in the fixing-supporting hole 32 of the bottom plate 30 by surface contact.

Further, a cut groove 63a is straightly formed at the center portion of the fixing projection 63, so it is possible to move up and down and rotate the locker 50 by inserting a tool such as a flathead screwdriver into the cut groove and forcibly rotating the guide pin 61 using the tool.

The guide member 64, which is a spring guide installed on the guide pin 61 and supporting the lower end of the second elastic supporting member 80, improves moving performance by minimizing contact when moving between the locker 50, which moves up and down and rotated, the guide 60, and the second elastic supporting member 80.

The first elastic supporting member 70, which is an elastic member installed between the bottom plate 30 and the elevation unit 40 and elastically supporting upward the elevation unit 40, is installed to provide an elastic supporting force upward as an elastic member such as a coil spring.

Further, the first elastic supporting member 70 elastically supports upward the bottom of the elevation unit 40 installed to move up and down in the housing 10, is compressed downward by pressure when a container is seated on the elevation unit 40 and is returned upward when a container is unloaded, thereby providing an up-down force to the elevation unit 40.

The second elastic supporting member 80, which is an elastic member installed between the locker 50 and the guide 60 and elastically supporting upward the locker 50, is installed to provide an elastic supporting force upward as an elastic member such as a coil spring.

Further, the second elastic supporting member 80 elastically supports upward the bottom of the locker 50 installed to move up and down in the housing 10, is compressed downward by pressure when a container is seated on the elevation unit 40 and is returned upward when a container is unloaded, thereby providing an up-down force to the locker 50.

As described above, according to the present disclosure, the apparatus includes a housing, a top plate, a bottom plate, an elevation unit, a locker, a guide, a first elastic supporting member, and a second elastic supporting member, thereby providing an effect that a container is automatically locked or unlocked by its own weight when it is loaded or unloaded, so it is possible to safely transport heavy containers always in a locked state and it is possible to prevent malfunction or poor function of the locker.

Further, since convex portions and concave portions are alternately and continuously formed on the housing, contact with the elevation unit is minimized, thereby providing an effect that it is possible to make up-down movement easy and minimize malfunction in up-down movement.

Further, a fixing-supporting hole and a drain hole are formed at the bottom plate, thereby providing an effect that it is possible to improve the fixing-supporting force for the guide and it is also possible to prevent damage to the bottom plate, the elevation unit, the locker, the guide, the first elastic supporting member, and the second elastic supporting member due to rainwater by draining rainwater flowing in the housing.

Further, the elevation unit includes a first elevator and a second elevator of which the inner surface is recessed to surround the circumference of the locker, thereby providing an effect that it is possible to make coupling between the elevation unit and the locker easy, increase the lifespan by improve a coupling-supporting force between the elevation unit and the locker and improving moving performance such that they move together.

Further, the corners of the locking head of the locker are curved and a luminescent member is installed on the locking head, thereby providing an effect that it is possible to prevent malfunction in locking and unlocking by the corners when loading or unloading a container and it is also possible to improve visibility when working at night.

Further, the spiral portion of the guide groove of the locker is spirally curved to rotate the locking head over 90 degrees, thereby providing an effect that it is possible to improve a force for rotating the locking head and improve reliability in rotation movement of the locking head.

The present disclosure may be accomplished in various ways without departing from the spirit and the main features of the present disclosure. Accordingly, the embodiments described above are only examples in all respects and should not be construed as limiting the present disclosure.

What is claimed is:

1. An apparatus for automatically locking a container that locks and unlocks a container loaded on a trailer or a railroad vehicle, the apparatus comprising:
  a cylindrical housing of which an internal cross-section is bent in a curved shape;
  a top plate installed on a top of the housing;
  a bottom plate installed under the housing;
  an elevation unit installed to move up and down in the housing;
  a locker installed in the elevation unit to move up and down together and installed to rotate left and right to lock and unlock a container;
  a guide being erect at a center of the bottom plate, inserted in a lower portion of the locker, and guiding up-down movement and rotation movement of the locker;
  a first elastic supporting member installed between the bottom plate and the elevation unit and elastically supporting upward the elevation unit; and
  a second elastic supporting member installed between the locker and the guide and elastically supporting upward the locker,
  wherein the housing includes:
  a plurality of protrusions formed with regular intervals circumferentially on an outer side and protruding outward; and
  a plurality of recessions extending between the protrusions and recessed inward.

2. The apparatus of claim 1, wherein the bottom plate includes:
  a bottom cover coupled to cover a bottom of the housing;
  a fixing-supporting hole that is formed at a center portion of the bottom cover and in which the guide is fitted and fixed; and
  a drain hole installed at a portion of the bottom cover and discharging rainwater flowing in the housing.

3. The apparatus of claim 1, wherein the elevation unit includes:
  a first elevator having fitting projections protruding at both ends and having a recessed inner surface to surround the circumference of a portion of the locker; and
  a second elevator having recessed fitting grooves, in which the fitting projections are coupled, at both ends to be coupled to the first elevator, and having a recessed inner surface to surround the circumference of another portion of the locker.

4. The apparatus of claim 1, wherein the locker includes:
  an elevation pin coupled and moving up and down in the elevation unit;
  a locking head protruding in a rectangular cone shape from an upper end of the elevation pin;
  a stopping step protruding around a lower portion of the elevation pin and supported in contact with the bottom of the elevation unit;
  an elastic supporting hole that is formed in an up-down direction in the center portion of the elevation pin and the second elastic supporting member is installed therein; and
  a guide groove spirally curved at a portion of the elastic supporting hole and guided by the guide.

5. The apparatus of claim 4, wherein corners of the locking head are curved.

6. The apparatus of claim 5, wherein a luminescent member is installed on the locking head.

7. The apparatus of claim 5, wherein the guide groove is spirally curved to rotate the locking head over 90 degrees.

8. The apparatus of claim 1, wherein the guide includes:
  a guide pin inserted and fitted in a lower portion of the locker and guiding up-down movement of the locker;
  a guide projection protruding from a portion of the side of the guide pin and guiding rotation movement of the locker; and
  a fixing projection protruding from a bottom of the guide pin and fitted, fixed, and supported to the bottom plate.

9. The apparatus of claim 8, wherein a cut surface is formed at a first end of the fixing projection such that the first end is fixed and supported in the bottom plate by surface contact.

* * * * *